US009756106B2

(12) United States Patent
Parthasarathy

(10) Patent No.: US 9,756,106 B2
(45) Date of Patent: Sep. 5, 2017

(54) METHODS AND SYSTEMS FOR ESTIMATING QUALITY OF EXPERIENCE (QOE) PARAMETERS OF SECURED TRANSACTIONS

(71) Applicant: Citrix Systems, Inc., Fort Lauderdale, FL (US)

(72) Inventor: Kannan Parthasarathy, Palo Alto, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 181 days.

(21) Appl. No.: 14/622,139

(22) Filed: Feb. 13, 2015

(65) Prior Publication Data

US 2016/0241626 A1    Aug. 18, 2016

(51) Int. Cl.
| G06Q 40/00 | (2012.01) |
| H04L 29/06 | (2006.01) |
| H04L 12/24 | (2006.01) |
| H04W 84/04 | (2009.01) |

(52) U.S. Cl.
CPC .......... *H04L 65/80* (2013.01); *H04L 41/5067* (2013.01); *H04L 65/605* (2013.01); *H04W 84/042* (2013.01)

(58) Field of Classification Search
CPC ....... H04L 65/80; H04L 43/08; H04L 65/605; H04W 84/042
See application file for complete search history.

(56) References Cited

U.S. PATENT DOCUMENTS

| 7,103,008 | B2 | 9/2006 | Greenblat et al. |
| 8,326,920 | B1 | 12/2012 | Modadugu et al. |
| 8,327,128 | B1 | 12/2012 | Prince et al. |
| 8,671,069 | B2 | 3/2014 | Chang et al. |
| 8,782,722 | B1 | 7/2014 | Kellicker |
| 9,191,284 | B2 | 11/2015 | Kordasiewicz et al. |
| 9,215,424 | B2 | 12/2015 | Bappu et al. |
| 9,311,499 | B2 | 4/2016 | Redlich et al. |
| 9,325,765 | B2 | 4/2016 | Su et al. |
| 2001/0032878 | A1 | 10/2001 | Tsiounis et al. |
| 2002/0033844 | A1 | 3/2002 | Levy et al. |

(Continued)

FOREIGN PATENT DOCUMENTS

EP    2725757 A1    4/2014

OTHER PUBLICATIONS

International Search Report and Written Opinion issued in PCT/US2015/053047 on Feb. 25, 2016; 17 pages.

(Continued)

*Primary Examiner* — Laura Gudorf
(74) *Attorney, Agent, or Firm* — Foley & Lardner LLP; Christopher J. Mckenna

(57) ABSTRACT

An apparatus is provided for estimating one or more quality of experience (QoE) parameters associated with a specific terminal. The apparatus includes a traffic processor configured to acquire a plurality of transactions for providing multimedia content to a specific terminal. At least one of such transactions is a secured transaction. The apparatus further includes a QoE parameter estimator configured to detect a quality level variation event based on the transactions and the sizes of the transactions, and to estimate one or more QoE parameters based on the detection of the quality level variation event.

43 Claims, 13 Drawing Sheets

(56) References Cited

U.S. PATENT DOCUMENTS

| | | |
|---|---|---|
| 2003/0032391 A1 | 2/2003 | Schweinhart et al. |
| 2003/0105830 A1 | 6/2003 | Pham et al. |
| 2004/0210756 A1 | 10/2004 | Mowers et al. |
| 2004/0255115 A1 | 12/2004 | DeMello et al. |
| 2005/0273592 A1 | 12/2005 | Pryor et al. |
| 2007/0073837 A1 | 3/2007 | Johnson-McCormick et al. |
| 2008/0062863 A1 | 3/2008 | Ginde |
| 2008/0222734 A1 | 9/2008 | Redlich et al. |
| 2008/0294556 A1 | 11/2008 | Anderson |
| 2009/0104954 A1 | 4/2009 | Weber et al. |
| 2009/0172129 A1 | 7/2009 | Singh et al. |
| 2009/0241159 A1 | 9/2009 | Campagna et al. |
| 2009/0248494 A1 | 10/2009 | Hueter et al. |
| 2010/0123727 A1 | 5/2010 | Kwa et al. |
| 2011/0082924 A1 | 4/2011 | Gopalakrishnan |
| 2011/0243553 A1 | 10/2011 | Russell |
| 2012/0084423 A1 | 4/2012 | McGleenon |
| 2013/0139164 A1 | 5/2013 | Balko |
| 2013/0144785 A1 | 6/2013 | Karpenko et al. |
| 2013/0198511 A1 | 8/2013 | Yoo et al. |
| 2014/0269269 A1* | 9/2014 | Kovvali ............... H04W 24/08 370/229 |
| 2015/0016253 A1 | 1/2015 | Jaska et al. |
| 2015/0026127 A1 | 1/2015 | Zachrisen et al. |
| 2015/0288617 A1 | 10/2015 | Dasher et al. |
| 2016/0088322 A1* | 3/2016 | Horev ............... H04N 21/8456 725/14 |
| 2016/0094602 A1 | 3/2016 | Fuh |
| 2016/0248684 A1 | 8/2016 | Parthasarathy |

OTHER PUBLICATIONS

Bestavros et al.; "Performance Evaluation of Two-Shadow Speculative Concurrency Control"; Feb., 1993; 201 pages.

* cited by examiner

780

| Transaction Index | Audio Transaction Timestamp | Video Transaction Timestamp |
|---|---|---|
| 0 | 0 | 0 |
| 1 | 3 | 4 |
| 2 | 5 | 6 |
| 3 | 6 | 7 |
| 4 | 19 | 19 |
| 5 | 21 | 21 |
| 6 | 22 | 23 |
| 7 | 24 | 25 |
| 8 | 25 | 30 |
| 9 | 27 | 32 |
| 10 | 29 | 38 |
| 11 | 30 | 40 |
| 12 | 32 | |
| 13 | 34 | |
| 14 | 36 | |
| 15 | 36 | |
| 16 | 38 | |

782 — Transaction Index
784 — Audio Transaction Timestamp
786 — Video Transaction Timestamp

Fig. 7B

| Audio Transaction Timestamp | Video Transaction Timestamp | | | | | | | | | | | |
|---|---|---|---|---|---|---|---|---|---|---|---|---|
| | 0 | 4 | 6 | 7 | 19 | 21 | 23 | 25 | 30 | 32 | 38 | 40 |
| 0 | 0 | 4 | 10 | 17 | 36 | 57 | 80 | 105 | 135 | 167 | 205 | 245 |
| 3 | 3 | 1 | 4 | 8 | 24 | 42 | 62 | 84 | 111 | 140 | 175 | 212 |
| 5 | 8 | 2 | 2 | 4 | 18 | 34 | 52 | 72 | 97 | 124 | 157 | 192 |
| 6 | 14 | 4 | 2 | 3 | 16 | 31 | 48 | 67 | 91 | 117 | 149 | 183 |
| 19 | 33 | 19 | 15 | 14 | 3 | 5 | 9 | 15 | 26 | 39 | 58 | 79 |
| 21 | 54 | 36 | 30 | 28 | 5 | 3 | 5 | 9 | 18 | 29 | 46 | 65 |
| 22 | 76 | 54 | 46 | 43 | 8 | 4 | 4 | 7 | 15 | 25 | 41 | 59 |
| 24 | 100 | 74 | 64 | 60 | 13 | 7 | 5 | 5 | 11 | 19 | 33 | 49 |
| 25 | 125 | 95 | 83 | 78 | 19 | 11 | 7 | 5 | 10 | 17 | 30 | 45 |
| 27 | 152 | 118 | 104 | 98 | 27 | 17 | 11 | 7 | 8 | 13 | 24 | 37 |
| 29 | 181 | 143 | 127 | 120 | 37 | 25 | 17 | 11 | 8 | 11 | 20 | 31 |
| 30 | 211 | 169 | 151 | 143 | 48 | 34 | 24 | 16 | 8 | 10 | 18 | 28 |
| 32 | 243 | 197 | 177 | 168 | 61 | 45 | 33 | 23 | 10 | 8 | 14 | 22 |
| 34 | 277 | 227 | 205 | 195 | 76 | 58 | 44 | 32 | 14 | 10 | 12 | 18 |
| 36 | 313 | 259 | 235 | 224 | 93 | 73 | 57 | 43 | 20 | 14 | 12 | 16 |
| 36 | 349 | 291 | 265 | 253 | 110 | 88 | 70 | 54 | 26 | 18 | 14 | 16 |
| 38 | 387 | 325 | 297 | 284 | 129 | 105 | 85 | 67 | 34 | 24 | 14 | 16 |

Fig. 7C

METHODS AND SYSTEMS FOR ESTIMATING QUALITY OF EXPERIENCE (QOE) PARAMETERS OF SECURED TRANSACTIONS

BACKGROUND

The recent few years has witnessed an explosive growth of data traffic in networks, particularly in cellular wireless networks. This growth has been fueled by a number of new developments including faster, smarter, and more intuitive mobile devices such as the popular iPhone® series and the iPad® series, as well as faster wireless and cellular network technologies that deliver throughputs on par or better than fixed line broadband technologies.

For many people today, a primary mode of access to the Internet is via mobile devices using cellular wireless networks. Websites such as Google™ or YouTube™ provide an increasing amount of multimedia content to mobile devices. For example, Google™ or YouTube™ provide videos using HTTP live streaming (HLS) protocols. An HLS protocol is an adaptive bit-rate (ABR) type protocol and is one of the protocols for providing multimedia content to mobile devices. In the past, some of the multimedia content provided using the HLS protocols are encrypted. In recent years, however, websites such as Google™ or YouTube™ are increasingly encrypting multimedia content provided using the HLS protocols. For example, videos are increasingly transported using secure sockets layer (SSL) or transport layer security (TLS) protocols. Another adaptive bit-rate type protocol for providing multimedia content to mobile devices is the dynamic adaptive streaming over HTTP (DASH) protocol. Websites can also provide encrypted multimedia content to mobile devices using the DASH protocols.

When encrypted multimedia content are provided to mobile devices using, for example, SSL or TLS protocols, measurement of quality of experience (QoE) parameters can be affected. Quality of experience parameters include, for example, user experience indexing (UXI) parameters that reflect the subscribers' quality of experience of using the mobile devices. The UXI parameters include metrics such as the total media time of the multimedia content provided, the video bitrate, and the amount of video stalling. Measurement of such UXI parameters can be used for implementing traffic management techniques or for reporting purposes. Traffic management is a broad concept and includes techniques such as throttling of low priority traffic, blocking or time shifting certain types of traffic, and traffic optimization. Optimization of web and video traffic is a key component in the array of traffic management techniques used by wireless operators. Therefore, when the measurement of the QoE parameters are affected by the encryption of the multimedia content transmitted to mobile devices, the implementation of traffic management techniques can be negatively affected as well.

BRIEF DESCRIPTION OF THE DRAWINGS

FIG. 7B is an exemplary table illustrating exemplary relations between transaction indices, audio transaction timestamps, and video transaction timestamps, consistent with embodiments of the present disclosure.

FIG. 7C is an exemplary score matrix illustrating exemplary mapping between audio transaction timestamps and video transaction timestamps, consistent with embodiments of the present disclosure.

DETAILED DESCRIPTION

Figure 1:
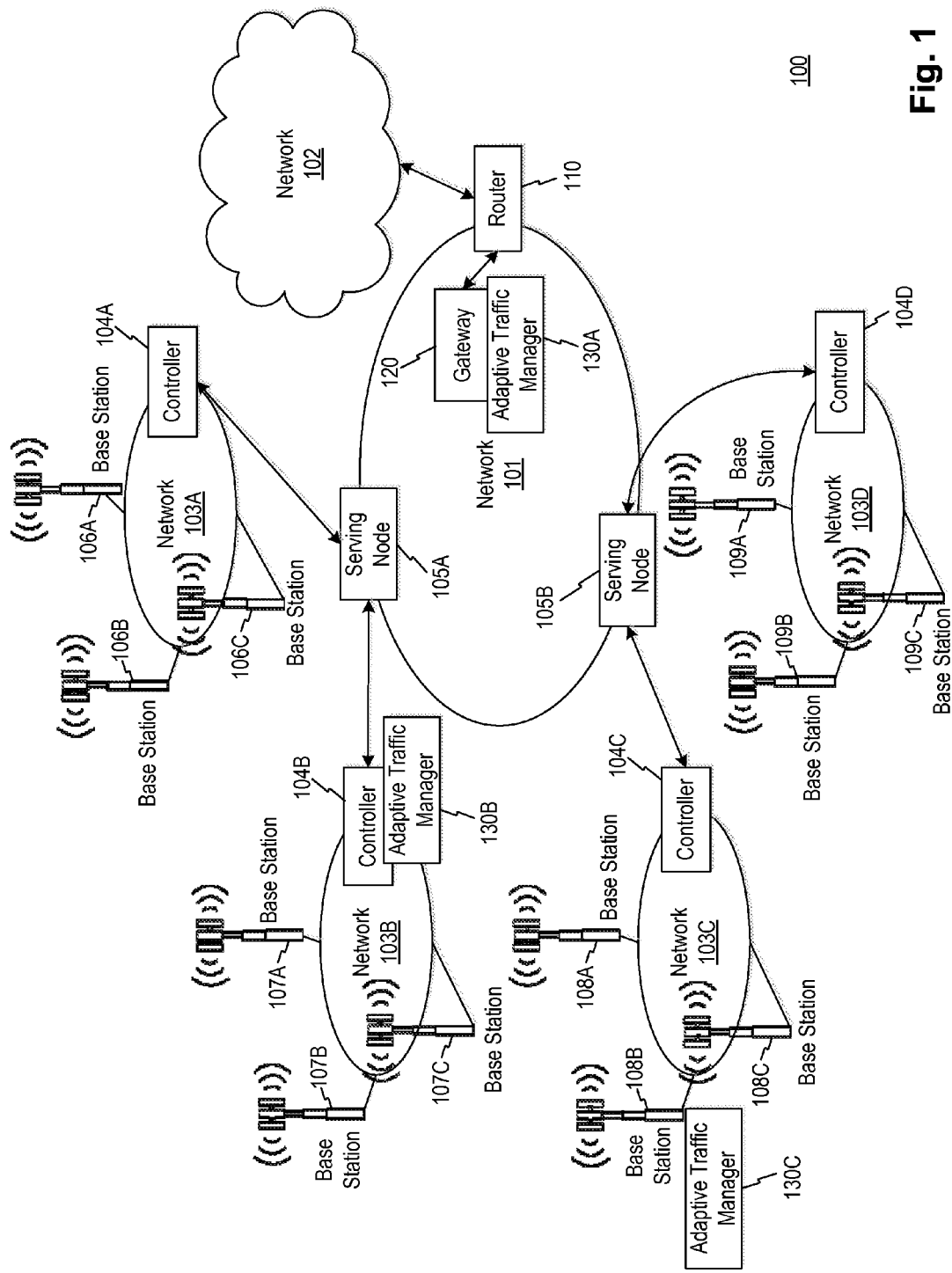
FIG. 1 is a block diagram of an exemplary network system, consistent with embodiments of the present disclosure.

Reference will now be made in detail to the exemplary embodiments consistent with the embodiments disclosed herein, the examples of which are illustrated in the accompanying drawings. Wherever possible, the same reference numbers will be used throughout the drawings to refer to the same or like parts.

The present disclosure relates to traffic management, and more particularly to estimating QoE parameters in secured or unsecured transactions for optimization or reporting of multimedia content provided to a specific terminal. The estimation of QoE parameters includes acquiring a plurality of transactions, detecting a quality level variation event based on the plurality of transactions and the sizes of one or more of the plurality of transactions, and estimating the one or more QoE parameters based on the detection of the quality level variation event.

Network congestion or overload conditions in networks are often localized both in time and space and affect only a small set of users at any given time. This can be caused by the topology of communication systems. In an exemplary cellular communication system, such as the system shown in FIG. 1, the system can have a tree-like topology, with a router or a gateway being the root of the tree and the mobile base stations being the leaves. This tree-like topology is similar across cellular technologies including Global System for Mobile Communication (GSM), Universal Mobile Telecommunications System (UMTS) adopting Wideband Code Division Multiple Access (W-CDMA) radio access technology, CDMA2000, Worldwide Interoperability for Microwave Access (WiMax), and Long Term Evolution (LTE). In a tree-like structure of a wireless network, the impact of network overload conditions depends on the level of aggregation in the network where that overload condition occurs. For example, an overload condition at a base station level affects only those users who are connected to that base station. Therefore, in some embodiments, the adaptive traffic management identifies the aggregation level at which an overload condition occurs and then applies traffic management techniques in a holistic fashion across only those users that are affected by the overload condition.

Adaptive traffic management is an approach wherein traffic management techniques such as web and video optimization can be applied selectively based on monitoring key indicators that have an impact on the Quality of Experience (QoE) of users or subscribers. Applying optimization can involve detecting the presence of multimedia content in secured or unsecured transactions, classifying multimedia content in the transactions, and estimating one or more QoE parameters associated with a specific terminal. The detection of the presence of multimedia content and the classification of the multimedia content are described in more detail in related U.S. patent application Ser. No. 14/503,274 filed on Sep. 30, 2014 and Ser. No. 14,629,917, to be filed with the current application. In the present disclosure, a subscriber can be a mobile terminal user who subscribes to a wireless or cellular network service. While the subscriber refers to the mobile terminal user or a user of a specific terminal here, future references to subscriber can also refer to a terminal that is used by the subscriber, or refer to a client device used by the subscriber.

FIG. 1 is a block diagram of an exemplary network system. Exemplary communication system 100 can be any type of system that transmits data packets over a network. For example, the exemplary communication system 100 can include one or more networks transmitting data packets across wired or wireless networks to terminals (terminals not shown in FIG. 1). The exemplary communication system 100 can have network architectures of, for example, a GSM network, a UMTS network that adopts Wideband Code Division Multiple Access (W-CDMA) radio access technology, a CDMA2000 network, and a WiMax network.

The exemplary communication system 100 can include, among other things, one or more networks 101, 102, 103 (A-D), one or more controllers 104(A-D), one or more serving nodes 105(A-B), one or more base stations 106(A-D)-109(A-D), a router 110, a gateway 120, and one or more adaptive traffic managers 130(A-C). At a high level, the network topology of the exemplary communication system 100 can have a tree-like topology with gateway 120 being the tree's root node and base stations 106-109 being the leaves.

Router 110 is a device that is capable of forwarding data packets between computer networks, creating an overlay Internetwork. Router 110 can be connected to two or more data lines from different networks. When a data packet comes in on one of the lines, router 110 can determine the ultimate destination of the data packet and direct the packet to the next network on its journey. In other words, router 110 can perform "traffic directing" functions. In the exemplary embodiment shown in FIG. 1, router 110 communicates with network 102 and gateway 120. Router 110 directs traffic from the network 102 to the gateway 120 and vice versa.

Network 101 can be any combination of radio networks, wide area networks (WANs), local area networks (LANs), or wireless networks suitable for packet-type communications, such as Internet communications. For example, in some exemplary embodiments, network 101 can be a General Packet Radio Service (GPRS) core network, which provides mobility management, session management and transport for Internet Protocol packet services in GSM and W-CDMA networks. The exemplary network 101 can include, among other things, a gateway 120, and one or more serving nodes 105(A-B).

Gateway 120 is a device that converts formatted data provided in one type of network to a particular format required for another type of network. Gateway 120, for example, may be a server, a router, a firewall server, a host, or a proxy server. Gateway 120 has the ability to transform the signals received from router 110 into a signal that network 101 can understand and vice versa. Gateway 120 may be capable of processing webpage, image, audio, video, and T.120 transmissions alone or in any combination, and is capable of full duplex media translations. In some embodiments, gateway 120 can be a Gateway GPRS Support Node (GGSN) that supports interworking between the GPRS network and external packet switched networks, like the Internet and X.25 networks.

Serving nodes 105 are devices that deliver data packets from gateway 120 to a corresponding network 103 within its geographical service area and vice versa. A serving node 105 can be a server, a router, a firewall server, a host, or a proxy server. A serving node 105 can also have functions including packet routing and transfer, mobility management (attach/detach and location management), logical link management, network accessing mediation and authentication, and charging functions. As an exemplary embodiment, a serving node 105 can be a Serving GPRS Support Node (SGSN). SGSN can have location register, which stores location information, e.g., current cell, current visitor location (Visitor Location Register) and user profiles, e.g., International Mobile Subscriber Identity (IMSI), and addresses used in the packet data network, of all GPRS users registered with this SGSN.

Network 102 can include any combination of wide area networks (WANs), local area networks (LANs), or wireless networks suitable for packet-type communications. In some exemplary embodiments, network 102 can be, for example, Internet and X.25 networks. Network 102 can communicate data packet with network 101 with or without router 110.

Networks 103 can include any radio transceiver networks within a GSM or UMTS network or any other wireless networks suitable for packet-type communications. In some exemplary embodiments, depending on the underlying transport technology being utilized, the Radio Access Network (RAN) or Backhaul area of network 103 can have a ring topology. In some embodiments, network 103 can be a RAN in a GSM system or a Backhaul area of a UMTS system. The exemplary network 103 can include, among other things, base stations 106-109 (e.g., base transceiver stations (BTSs) or Node-Bs), and one or more controllers 104(A-C) (e.g., base-station controllers (BSCs) or radio network controllers (RNCs)). Mobile terminals (not shown in FIG. 1) communicate with BTS/Node-B 106-109 which have radio transceiver equipment. BTS/Node-B 106-109 communicate with BSC/RNC 104(A-C), which are responsible for allocation of radio channels and handoffs as users move from one cell to another. The BSC/RNC 104(A-C) in turn communicate to serving nodes 105, which manage mobility of users as well as provide other functions such as mediating access to the network and charging.

As shown in FIG. 1, adaptive traffic manager 130 can be deployed at one or more locations within communication system 100, including various locations within network 101 and 103. In some embodiments, adaptive traffic manager 130 can be located at gateway 120, at controller 104, at one or more base stations 106-109, or any other locations. Adaptive traffic manager 130 can be either a standalone network element or can be integrated into existing network elements such as gateway 120, controllers 104, and base stations 106-109. Adaptive traffic manager 130 can continuously monitor several parameters of communication system 100. The parameters can be used to generate traffic management rules. The traffic management rules are generated dynamically and change in real-time based on the monitored parameters. After the rules are generated in real time, the rules are applied to data traffic being handled by adaptive traffic manager 130. Moreover, adaptive traffic manager 130 can include a QoE parameter estimator 220 (shown in FIG. 2) for estimating QoE parameters in secured or unsecured transactions. QoE parameter estimator 220 is described in more detail below.

To optimize multimedia traffic, traffic management techniques can be implemented on a proxy device (e.g., adaptive traffic manager 130) that is located somewhere between a content server and client devices (e.g., mobile terminals). The proxy device can determine the type of content requested by a specific mobile terminal (e.g., video content) and apply optimization techniques. The content providers can transmit multimedia content using unsecured or secured communication protocols such as hypertext transfer protocol secure (HTTPS) protocols, TLS protocols, and SSL protocols. The proxy device can determine the type of content being transmitted in both unsecured and secured transactions using client requests and server responses. In secured transactions, the client requests and server responses are encrypted and therefore may not be decipherable by the proxy device.

Moreover, a variety of multimedia protocols above the HTTP layer are available for transmitting of multimedia contents. The protocols can generally be classified into two broad categories: progressive download (PD) protocols and adaptive bit rate (ABR) protocols. Examples of adaptive bit-rate protocols include HTTP live streaming (HLS) protocols, dynamic adaptive streaming over HTTP (DASH) protocols, and smooth streaming. Examples of PD protocols include flash video (FLV) file and Mpeg-4 (MP4) file downloads over HTTP.

For both PD and adaptive bit-rate protocols, multiple quality levels (e.g., video quality level of 1080p, 720p, etc.) of the same multimedia content can be stored at the server for transmitting to client devices. In the case of transmitting of multimedia content using PD protocols, the multimedia quality level requested by the client device cannot be changed after the initial selection at the beginning of transmission. In the case of transmitting of multimedia content using adaptive bit-rate protocols, the multimedia quality level requested by the client device can be changed to reflect fluctuations in the available network bandwidth between the server and the client device. Therefore, adaptive bit-rate protocols typically provide a better user experience because the highest available quality level can be selected based on the available network bandwidth.

To apply traffic management techniques, such as to apply streaming policy control (SPC) to the transmission of multimedia contents, it is usually required to estimate QoE parameter associated with a specific terminal. Streaming policy control can be any traffic management technique that manages data flow or controls congestion associated with streaming of multimedia data across a network, such as the Internet. For example, SPC can allow streaming of the multimedia content to more effectively share bandwidths with other network traffics. SPC can also improves smoothness in streaming and provide decreased and more predictable latency.

Figure 2:
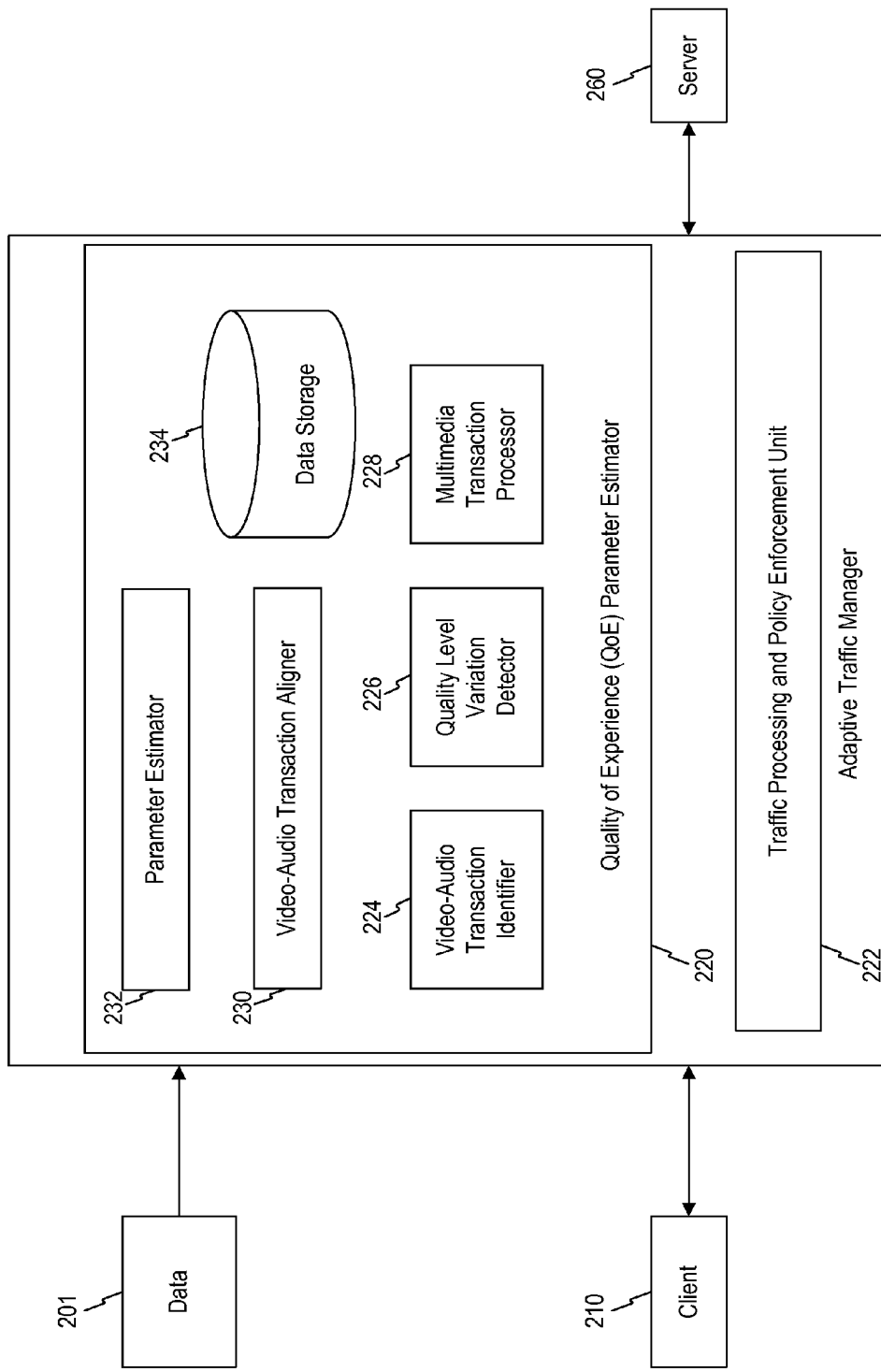
FIG. 2 is a block diagram illustrating an embodiment of an exemplary QoE parameter estimator, consistent with embodiments of the present disclosure.

FIG. 2 is a block diagram illustrating an exemplary adaptive traffic manager 130, consistent with embodiments of the present disclosure. In some embodiments, as shown in FIG. 2, QoE parameter estimator 220 can be integrated with adaptive traffic manager 130. In some embodiments, QoE parameter estimator 220 can be integrated into other existing network elements such as gateway 120, controllers 104, and/or one or more base stations 106-109. QoE parameter estimator 220 can also be a standalone network element located at gateway 120, controller 104, one or more base stations 106-109, or any other proper locations.

As shown in FIG. 2, adaptive traffic manager 130 can include, among other things, a traffic processing and policy enforcement unit 222 and QoE parameter estimator 220. Adaptive traffic manager 130 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible and/or non-transitory computer-readable medium, such as random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, flash memory, registers, caches, and/or any other storage medium. Singular terms, such as "memory" and "computer-readable storage medium," can additionally refer to multiple structures, such as a plurality of memories and/or computer-readable storage mediums. Alternatively, the methods can be implemented in hardware components or combinations of hardware and software such as, for example, ASICs or one or more computer.

Adaptive traffic manager 130 can obtain external data 201 for processing. External data 201 can include network probes, Remote Authentication Dial-In User Service (RADIUS), Policy Charging and Rules Function (PCRF), and Subscriber Profile Repository (SPR). Adaptive traffic manager 130 can also communicate with one or more terminals (e.g., client 210) and one or more servers (e.g., server 260), either directly or indirectly. Adaptive traffic manager 130 can include, for example, a traffic processing and policy enforcement (TPPE) unit 222 and a QoE parameter estimator 220. Each of these components can be one or more modules, which can be one or more packaged functional hardware units designed for use with other components or a part of a program that performs a particular function, corresponding to the particular step, of related functions. QoE parameter estimator 220 can also include a data storage 234, which can also be external to QoE parameter estimator 220.

Figure 5A:
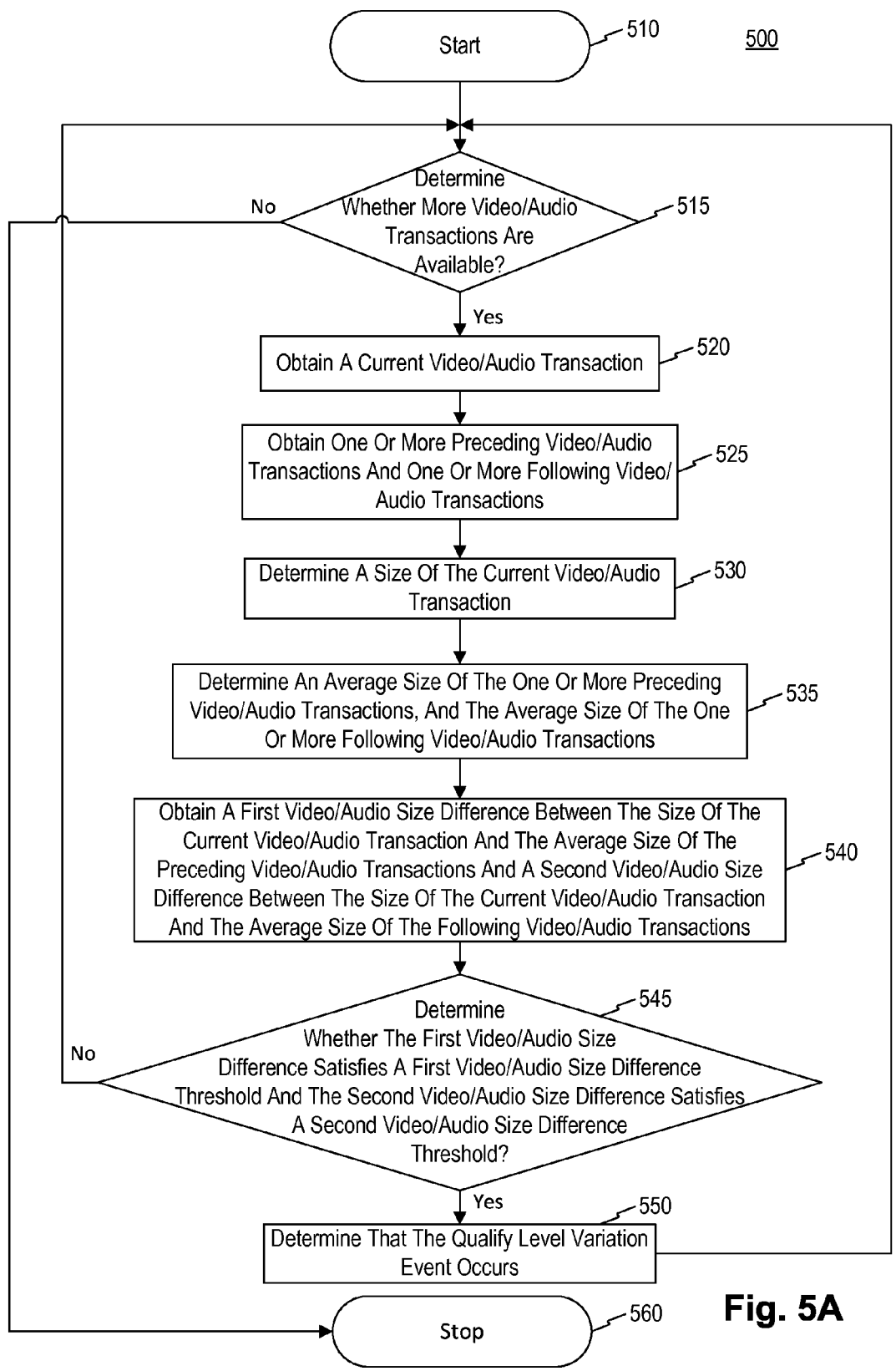
FIG. 5A is a flowchart representing an exemplary method for detecting a quality level variation event, consistent with embodiments of the present disclosure.
Figure 5B:
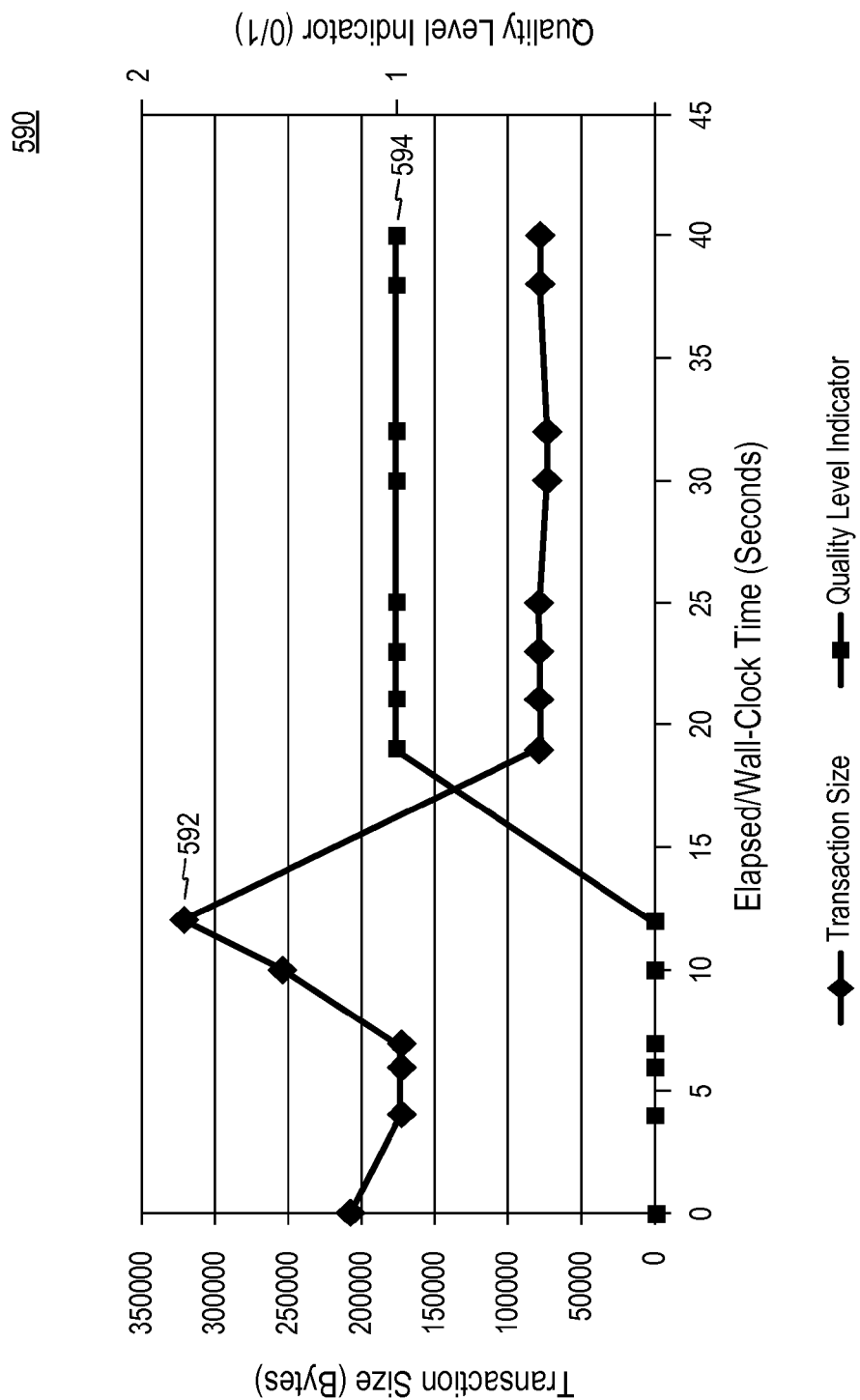
FIG. 5B is a diagram illustrating exemplary relations of transaction sizes and the quality level variation, consistent with embodiments of the present disclosure.
Figure 6A:
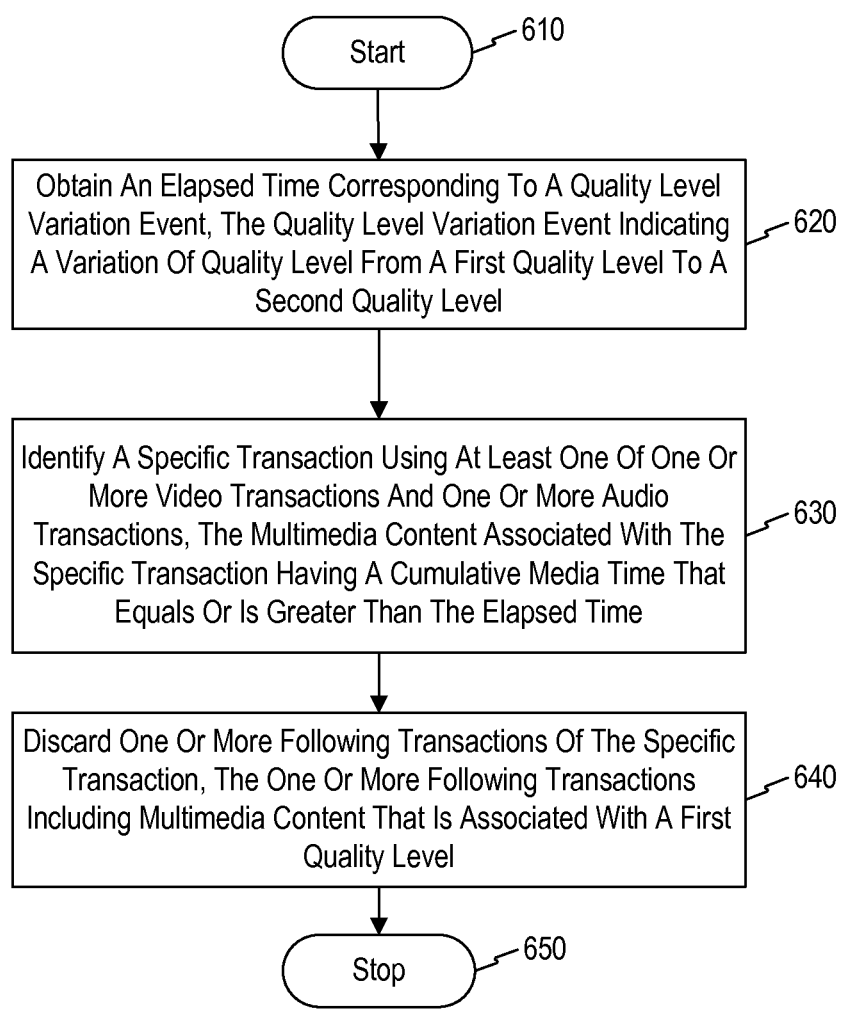
FIG. 6A is a flowchart representing an exemplary method for processing video transactions or audio transactions, consistent with embodiments of the present disclosure.
Figure 6B:
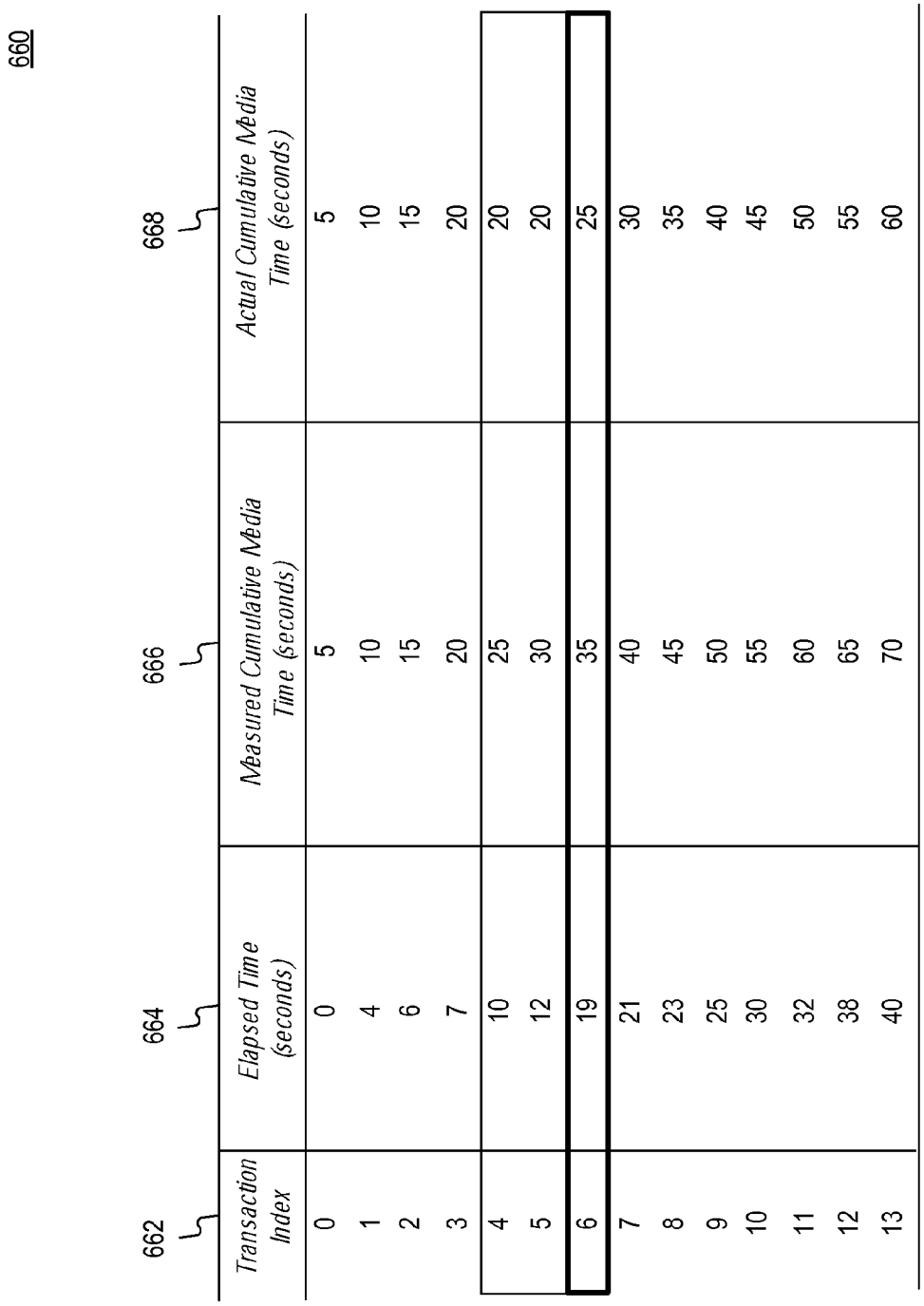
FIG. 6B is an exemplary timing table illustrating the relations between the elapsed times, measured cumulative media times, and actual cumulative media times, consistent with embodiments of the present disclosure.
Figure 7A:
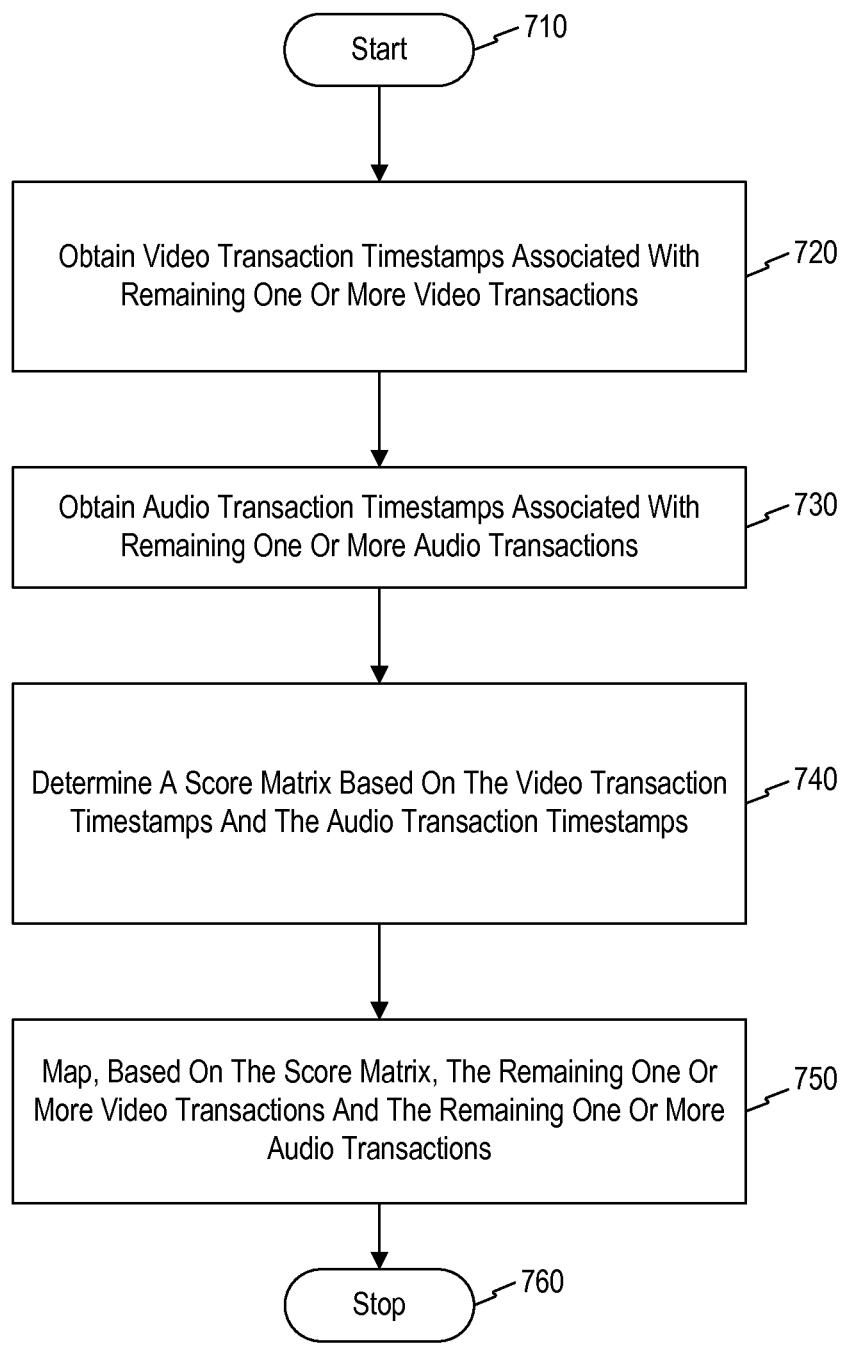
FIG. 7A is a flowchart representing an exemplary method for identifying a mapping between video transactions and audio transactions, consistent with embodiments of the present disclosure.
Figure 8:
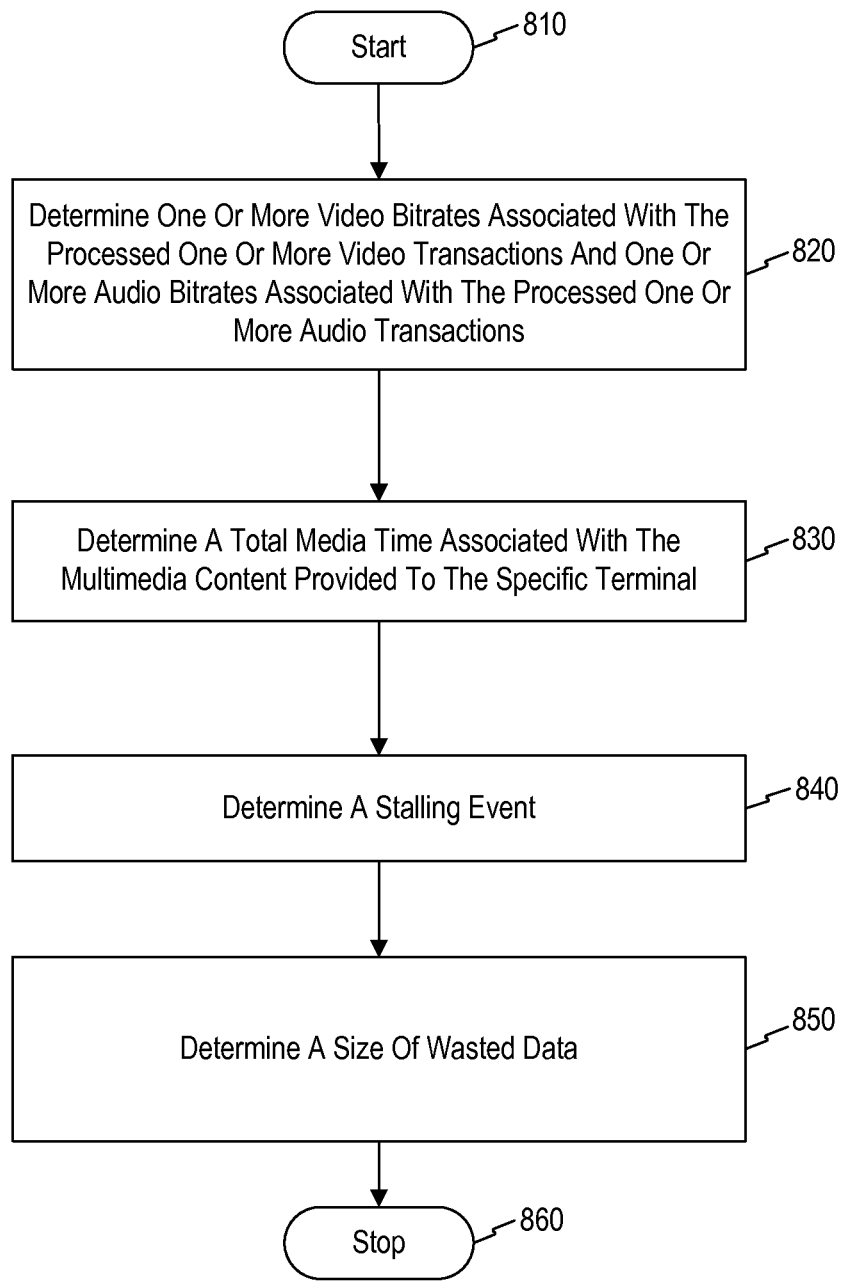
FIG. 8 is a flowchart representing an exemplary method for determining one or more quality of experience (QoE) parameters, consistent with the embodiments of the present disclosure.

In some embodiments, QoE parameter estimator 220 can include, among other things, a video-audio transaction identifier 224, a quality level variation detector 226, a multimedia transaction processor 228, a video-audio transaction aligner 230, a parameter estimator 232, and a data storage 234. In some embodiments, video-audio transaction identifier 224 can identify transactions as audio transactions or video transactions, as illustrated using FIGS. 4A-4B. Quality level variation detector 226 can detect a quality level variation event using the video transactions and/or the audio transactions, as illustrated in FIGS. 5A-5B. Multimedia transaction processor 228 can process the video transactions and/or audio transactions based on the detected quality level variation event, as illustrated in FIGS. 6A-6B. Video-audio transaction aligner 230 can map the processed video transactions and audio transactions, as illustrated in FIGS. 7A-7C. Parameter estimator 232 can estimate one or more QoE parameters using the processed video transactions and audio transactions, as illustrated in FIG. 8. The operation of adaptive traffic manager 130 and its components are further described using FIGS. 3-8 below.

Figure 3:
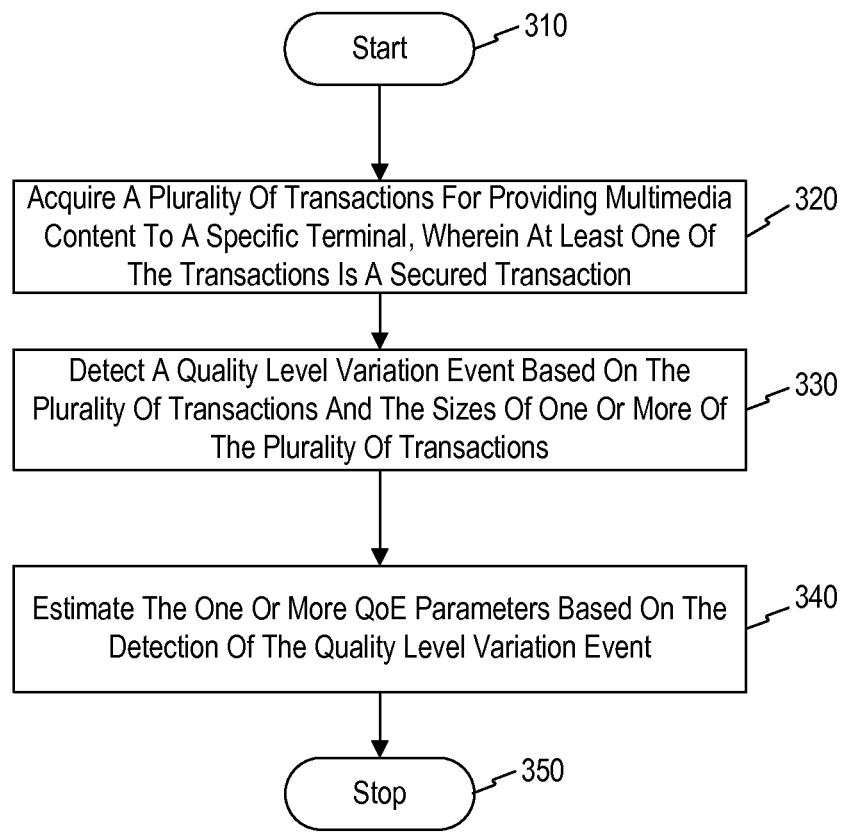
FIG. 3 is a flowchart representing an exemplary method for estimating QoE parameters associated with a specific terminal, consistent with embodiments of the present disclosure.

FIG. 3 is a flowchart representing an exemplary method 300 for estimating QoE parameters associated with a specific terminal, consistent with embodiments of the present disclosure. Referring to FIG. 3, it will be readily appreciated that the illustrated procedure can be altered to delete steps or further include additional steps. Method 300 can be performed by adaptive traffic manager 130, and more particularly by QoE parameter estimator 220 of the adaptive traffic manager 130. While method 300 is described as being performed by QoE parameter estimator 220, it is appreciated that other components of adaptive traffic manager 130 or other devices can be involved. Further, it is appreciated that any other adaptive traffic manager can also perform method 300.

Referring to FIG. 3, after an initial step 310, TPPE unit 222 can acquire (step 320) a plurality of transactions for providing multimedia content to specific terminal (e.g., client 210). In some embodiments, at least one of the transactions is a secured transaction. For example, the multimedia content associated one or more transactions can be encrypted. TPPE unit 222 is a lower stack in the processing stack of adaptive traffic manager 130. TPPE unit 222 can receive multimedia content, which can include video and/or web data, and provide the multimedia content to other elements and/or modules in adaptive traffic manager 130. The multimedia content can be stored in a data storage device (e.g., data storage 234) that is local to or remote from adaptive traffic manager 130. TPPE unit 222 is responsible for routing traffic between client 210 and the server 260. TPPE unit 222 can also implement traffic management techniques including blocking, rate limiting, lossless and lossy data compression, and other traffic optimization techniques. TPPE unit 222 can be a software program and/or a hardware device.

After TPPE unit 222 acquires the transactions, QoE parameter estimator 220 can detect (step 330) a quality level variation event based on the plurality of transactions and the sizes of the plurality of transactions; and estimate (step 340) the one or more QoE parameters based on the detection of the quality level variation event. In some embodiments, the estimation of the one or more QoE parameters can be used for optimizing or reporting of the multimedia content provided to the specific terminal. More details of steps 330 and 340, which can be performed by various components of QoE parameter estimator 220, are described using FIGS. 4A-8 below. After step 340, method 300 can proceed to a stop 350. It is appreciated that method 300 can also be repeated for detecting more quality level variation events and for estimating more QoE parameters.

Referring to FIG. 2, QoE parameter estimator 220 can include, among other things, video-audio transaction identifier 224, quality level variation detector 226, multimedia transaction processor 228, video-audio transaction aligner 230, parameter estimator 232, and data storage 234. While FIG. 2 illustrates that these components of QoE parameter estimator 220 are separate from each other, it is appreciated that one or more of these components can be integrated together to form an integral piece.

Figure 4A:
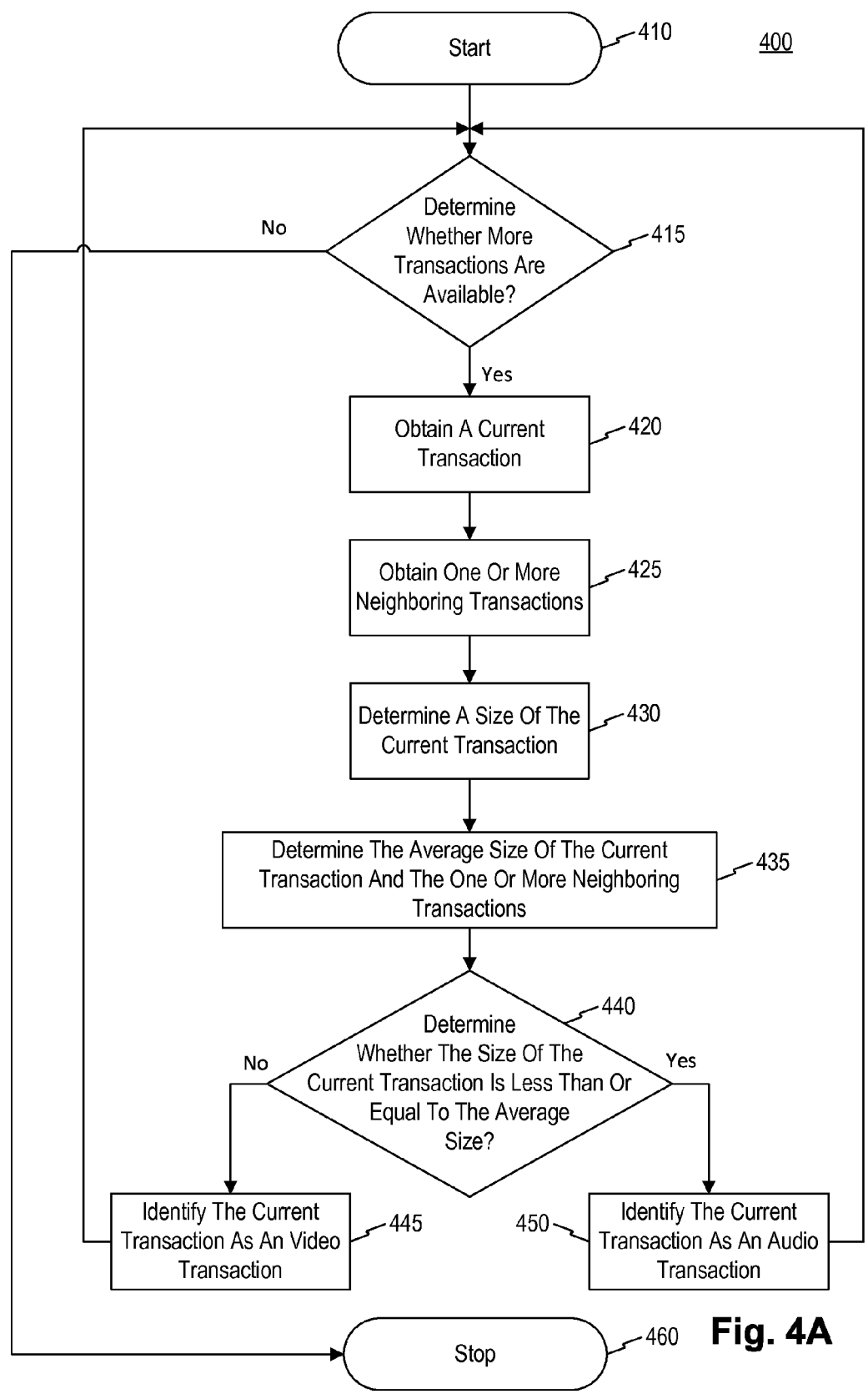
FIG. 4A is a flowchart representing an exemplary method for identifying video transactions and audio transactions, consistent with embodiments of the present disclosure.

FIG. 4A is a flowchart representing an exemplary method 400 for identifying video transactions and audio transactions, consistent with embodiments of the present disclosure. Referring to FIG. 4A, it will be readily appreciated that the illustrated procedure can be altered to delete steps or further include additional steps. Method 400 can be performed by adaptive traffic manager 130, and more particularly by video-audio transaction identifier 224 of the adaptive traffic manager 130. While method 400 is described as being performed by video-audio transaction identifier 224, it is appreciated that other components of adaptive traffic manager 130 or other devices can be involved. Further, it is appreciated that any other adaptive traffic manager can also perform method 400.

Referring to FIG. 4A, video-audio transaction identifier 224 can identify transactions as audio transactions or video transactions. In some embodiments, after an initial step 410, video-audio transaction identifier 224 can determine (step 415) whether more transactions are available for identification or whether all transactions have been identified. If all transactions have been identified as either video transactions or audio transactions, video-audio transaction identifier 224 proceeds to a stop 460. If more transactions are available for identification, video-audio transaction identifier 224 can obtain (step 420) a current transaction for identification. In some embodiments, each transaction can be identified corresponding to the order it was acquired, or identified in any other desired order.

To identify the current transaction as an audio transaction or a video transaction, video-audio transaction identifier 224 can obtain (step 425) one or more neighboring transactions of the current transaction. Neighboring transactions are transactions that are communicated or acquired in proximity of time. For example, video-audio transaction identifier 224 can obtain five neighboring transactions that are closest in time to the current transaction.

Neighboring transactions can include video and audio transactions that are associated with the same media time segment. A media time segment can correspond to a time segment having a certain length of the media time. A media time length of multimedia content associated with a single video or audio transaction can be, for example, five seconds. Thus, a media time segment can have a length of, for example, five seconds, where the segment begins, for example, at 30 seconds and end at 35 seconds. In some embodiments, if the current transaction is an audio transaction, the neighboring transactions of the current transaction can have a higher probability to include a video transaction that corresponds to the same media time segment of the audio transaction, and vice versa. For example, if the current transaction is an audio transaction associated with a media time segment from 30 seconds to 35 seconds, one of its neighboring transactions has a higher probability to include a video transaction that is associated with the same media time segment, i.e., a media time segment from 30 seconds to 35 seconds.

Referring to FIG. 4A, video-audio transaction identifier 224 can determine (step 430) a size of the current transaction and determine (step 435) an average size of the current transaction and the one or more neighboring transactions. Video transactions can have sizes that are different from those of audio transactions. For example, video transactions can have sizes of 64-80 Kilo-Bytes (KB), 160-176 KB, 320-336 KB, 384-400 KB, 704-720 KB, etc. Different sizes of the video transactions correspond to different video quality levels. Audio transactions can have sizes of, for example, 23-48 KB, 72-80 KB, etc. In some embodiments, the number of different sizes of audio transactions (e.g., two) is less than the number of different sizes of video transactions (e.g., five), reflecting that audio transactions can have less number of quality levels than that of the video transactions.

After obtaining the sizes, video-audio transaction identifier 224 can determine (step 440) a relation of the size of the current transaction and the average size of the current transaction and the one or more neighboring transactions, such as determine whether the size of the current transaction is less than or equal to the average size. In some embodiments, the quality level of a video transaction can correspond to the quality level of an audio transaction. For example, if the video transaction has a low video quality level, the audio transaction associated with the same media time segment as that of the video transaction can also have a low audio quality level. Therefore, the size of a video transaction can be greater than the size of the audio transactions associated with the same media time segment. As described above, the neighboring transactions of the current transaction can have a high probability to include an audio transaction or a video transaction associated with the same media time segment as that of the current transaction. As a result, the average size of the current transaction and the neighboring transactions can be less than the size of a video transaction, but greater than the size of an audio transaction.

Figure 4B:
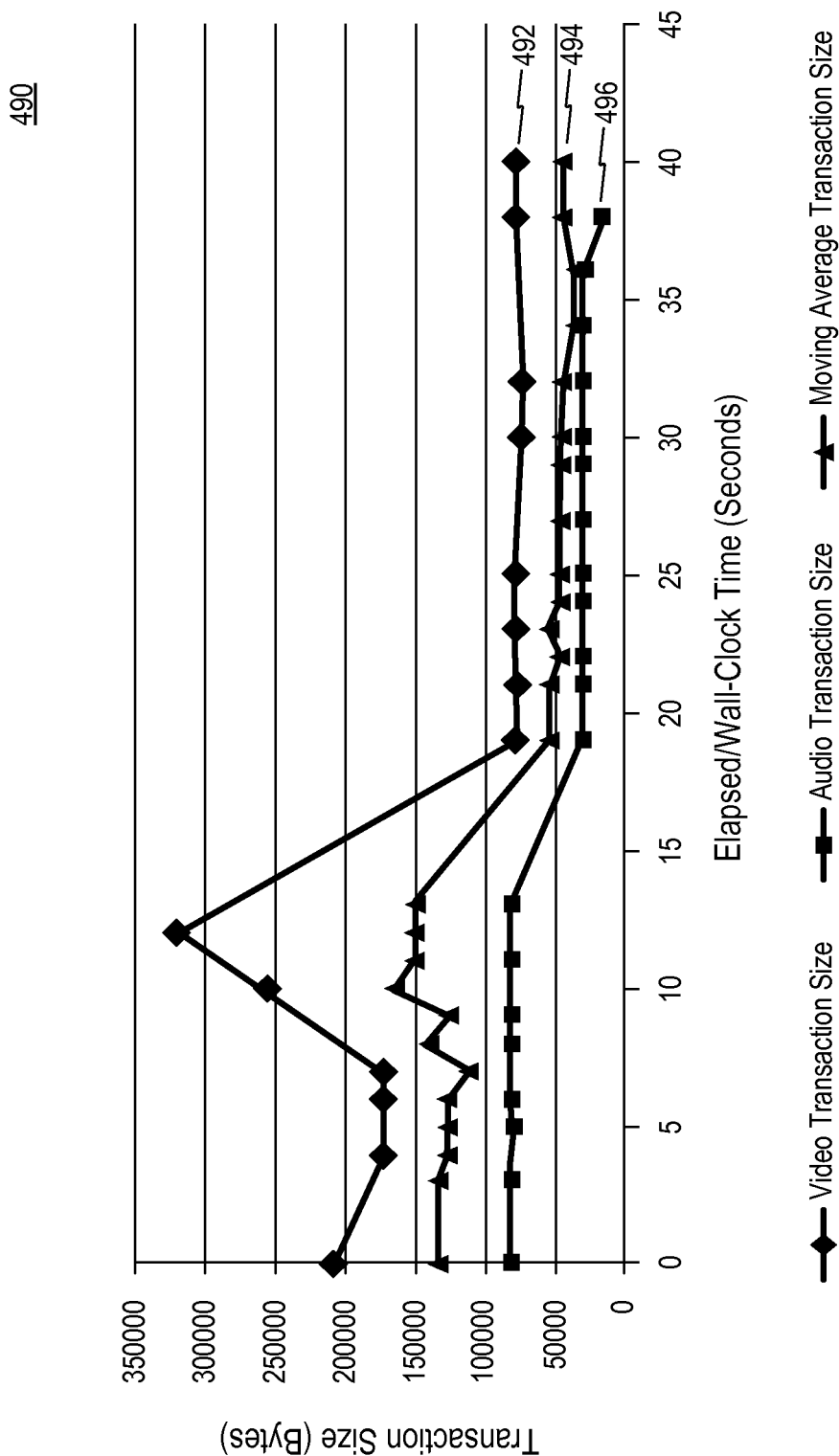
FIG. 4B is a diagram illustrating exemplary relations between average transaction sizes, the sizes of identified video transactions, and the sizes of identified audio transactions, consistent with embodiments of the present disclosure.

An example of the relation between the sizes of audio transactions, video transactions, and average transactions are illustrated in FIG. 4B, which is a diagram illustrating exemplary relations 490 between average transaction sizes, the sizes of identified video transactions, and the sizes of identified audio transactions. Referring to FIG. 4B, curve 492 illustrates a relation between transaction sizes of video transactions and elapsed times, also referred to as wall-clock times. In some embodiments, the elapsed time represents the time at which a video transaction or an audio transaction is completed. Curve 494 illustrates a relation between elapsed times and the moving average transaction sizes of the current transaction and neighboring transactions. Curve 496 illustrates a relation between transaction sizes of audio transactions and elapsed times. As shown in FIG. 4B, in some embodiments, the moving average transaction sizes (illustrated by curve 494) are greater than the audio transaction sizes (illustrated by curve 496), but are less than the video transaction sizes (illustrated by curve 492).

Referring back to FIG. 4A, after determining the relation of the size of the current transaction and the average size of the current transaction and the neighboring transactions, video-audio transaction identifier 224 can identify the current transaction as an audio transaction or a video transaction based on the determined relation. For example, if the size of the current transaction is greater than the average size of the current transaction and the neighboring transactions, video-audio transaction identifier 224 can identify (step 445) the current transaction as a video transaction. If the size of the current transaction is less than or equal to the average size of the current transaction and the neighboring transactions, video-audio transaction identifier 224 can identify (step 450) the current transaction as an audio transaction. After the current transaction is identified, video-audio transaction identifier 224 can move to identify the next transaction until all transactions are identified as audio transactions or video transactions. Method 400 can then proceed to a stop 460.

FIG. 5A is a flowchart representing an exemplary method 500 for detecting a quality level variation event, consistent with embodiments of the present disclosure. Referring to FIG. 5A, it will be readily appreciated that the illustrated procedure can be altered to delete steps or further include additional steps. Method 500 can be performed by adaptive traffic manager 130, and more particularly by quality level variation detector 226 of the adaptive traffic manager 130. While method 500 is described as being performed by quality level variation detector 226, it is appreciated that other components of adaptive traffic manager 130 or other devices can be involved. Further, it is appreciated that any other adaptive traffic manager can also perform method 500.

Referring to FIG. 2, quality level variation detector 226 can detect a quality level variation event using the video transactions and/or audio transactions. The quality level for transmitting multimedia content between server 260 and client 210 can vary due to many reasons. For example, under certain protocols such as adaptive bitrate (adaptive bit-rate) protocols, during the beginning of the transmission (e.g., a few seconds), client 210 can estimate the channel bandwidth and dynamically change the quality level of the multimedia content being transmitted. As an example, if the current quality level is low (e.g., a video quality level of 240p) and client 210 determines that the available bandwidth is enough to increase the quality level by one or more resolution steps, client 210 can request to increase the quality level (e.g., to a video quality level of 720p) in subsequent multimedia content it receives from server 260.

As another example, if client 210 determines that the current available bandwidth is not enough to support the current quality level (e.g., a video quality level of 1080p) associated with the multimedia content, client 210 can request to decrease the quality level (e.g., to a video quality level of 720p) in subsequent multimedia content it receives from server 260. As a result, the quality level can vary from time to time due to bandwidth availability or any other reasons. A quality level can be a video quality level or an audio quality level. While the above example uses video quality level, it is appreciated that audio quality level can also vary from time to time.

In some embodiments, when a quality level varies during the transmitting of the multimedia content, one or more transactions can include the same multimedia content at different quality levels. For example, before a quality level varies from a first quality level (e.g., low quality level) to a second quality level (e.g., high quality level) at a certain elapsed time (e.g., 35 seconds), multimedia content associated with one or more media time segments (e.g., 20-25 seconds, 25-30 seconds, 30-35 seconds, etc.) at the first quality level can have been already communicated in a plurality of transactions between client 210 and server 260. The plurality of transactions can be acquired by adaptive traffic manager 130.

After the quality level varies, the same multimedia content associated with the same media time segments (e.g., 20-25 seconds, 25-30 seconds, 30-35 seconds, etc.) at the second quality level can be communicated in a plurality of additional transactions between client 210 and server 260. The additional transactions can also be acquired by adaptive traffic manager 130. As a result, transactions including the same multimedia content associated with the same media time segments at two different quality levels can both be acquired by adaptive traffic manager 130. In some embodiments, multimedia transaction processor 228 of adaptive traffic manager 130 can discard the transactions including the same multimedia content associated with same media time segments at the first quality level. Multimedia transaction processor 228 are described in more detail below.

The detection of the quality level variation event can have an impact on the estimation of QoE parameters such as video bitrate. For example, estimating the video bitrate can be based on the transaction sizes of the transactions that are not discarded.

When the quality level variation event occurs, the sizes of the transactions can vary. For example, after a video quality level increases (e.g., from a quality level of 720p to 1080p), the transaction size can increase (e.g., from 384-400 KB to 704-720 KB). Under certain protocols such as the adaptive bit-rate protocols, the variation of the transaction sizes can occur even if the quality level does not vary. For example, while a first transaction and a second transaction can each include multimedia content associated with a five-second media time segment at the same quality level, the multimedia content included in the first transaction can have mostly still images, while multimedia content included in the second transaction can have frequently varying images (e.g., images depicting actions). As a result, the transaction size of the second transaction can be greater than that of the first transaction, although the two transactions both have the same media time segments at the same quality level.

Referring to FIG. 5A, quality level variation detector 226 can perform method 500 to detect quality level variation events with respect to video transactions or audio transactions. Using video transactions as an example, quality level variation detector 226 can determine (step 515) whether more video transactions are available for quality level variation detection. If no more video transactions are available, quality level variation detector 226 can proceed to a stop 560. If more transactions are available, quality level variation detector 226 can obtain (step 520) a current video transaction for quality level detection and obtain (step 525) one or more preceding video transactions and one or more following video transactions. The preceding video transactions are transactions that were communicated or were acquired before the current video transaction. And the following video transactions are transactions that were communicated or were acquired after the current video transaction. In some embodiments, quality level variation detector 226 can configure the number (e.g., two) of the preceding video transactions and the number of following video transactions to be obtained. Based on the configuration, for example, two preceding video transactions and two following video transactions can be obtained. It is appreciated that any other number of the preceding video transactions and the following video transactions can also be obtained for detection of quality level variation.

Referring to FIG. 5A, after obtaining the current video transaction, the preceding video transactions, and the following video transactions, quality level variation detector 226 can determine (step 530) the size of the current video transaction, and determine (step 535) the average size of the one or more preceding video transactions and the average size of the one or more following video transactions. The average size is the total size of the transactions divided by the number of the transactions. For example, the average size of the preceding video transactions or following video transactions can be the total size of two preceding video transactions or two following video transactions, respectively, divided by two.

After the sizes are determined, quality level variation detector 226 can obtain (step 540) a first video size difference and a second video size difference. The first video size difference can be the difference between the size of the current video transaction and the average size of the preceding video transactions. The second video size difference can be the difference between the size of the current video transaction and the average size of the following video transactions. Using at least one of the first video size difference and the second video size difference, quality level variation detector 226 can detect the quality level variation event.

As an example, quality level variation detector 226 can determine (step 545) whether the first video size difference satisfies a first video size difference threshold and whether the second video size difference satisfies a second video size difference threshold. If both are satisfied, quality level variation detector 226 can determine (step 550) that a quality level variation event occurs. For example, the first video size difference threshold can be 40% and the second video size difference threshold can be 5%. If quality level variation detector 226 determines that the first video size difference (e.g., the absolute value of the size difference between the current video transaction and the one or more preceding video transactions) is greater than or equal to 40%, and that the second video size difference (e.g., the absolute value of the size difference between the current video transaction and the one or more following video transactions) is less than 5%, quality level variation detector 226 can determine that a quality level variation event occurs. It is appreciated that the first video size difference threshold and the second video size difference threshold can be any other values (e.g., 50%, 1%, etc.).

Referring to FIG. 5A, in some embodiments, if quality level variation detector 226 determines (step 545) that either the first video size difference does not satisfy the first video size difference threshold or the second video size difference does not satisfy the second video size difference threshold, quality level variation detector 226 can determine that no quality level variation event occurs and the method proceeds to step 515.

As mentioned above, it is appreciated that quality level variation detector 226 can also perform method 500 with respect to audio transactions. The details are similar to those described above with respect to video transactions. It is appreciated that method 500 can also be repeated to detect more quality level variation events.

FIG. 5B is a diagram illustrating exemplary relations 590 of transaction sizes variation and the detection of quality level variation, consistent with embodiments of the present disclosure. Referring to FIG. 5B, curve 592 illustrates a relation between transaction sizes of video or audio transactions and elapsed times, also referred to as wall-clock times. Curve 594 illustrates a relation between a quality level detection indicator and the elapsed times. As shown in FIG. 5B, in some embodiments, when a video or audio transaction (e.g., the transaction at elapsed time of about 19 seconds) has a size that is substantially different (e.g., different by 40%) from the preceding transactions and is substantially similar (e.g., within 5%) to the following transactions, the quality level detection indicator changes from, for example, "0" to "1".

In some embodiments, as shown in FIG. 5B, when obtaining one or more preceding video transactions or audio transactions, quality level variation detector 226 can determine that one or more of such preceding transactions are spurious (e.g., the transaction at elapsed time 10-12 seconds)

and ignore those transactions. Spurious transactions reflect a temporary or momentary change of the transaction size due to a momentary quality level change or other short duration events.

FIG. 6A is a flowchart representing an exemplary method 600 for processing video transactions or audio transactions based on the detected quality level variation event, consistent with embodiments of the present disclosure. Referring to FIG. 6A, it will be readily appreciated that the illustrated procedure can be altered to delete steps or further include additional steps. Method 600 can be performed by adaptive traffic manager 130, and more particularly by multimedia transaction processor 228 of the adaptive traffic manager 130. While method 600 is described as being performed by multimedia transaction processor 228, it is appreciated that other components of adaptive traffic manager 130 or other devices can be involved. Further, it is appreciated that any other adaptive traffic manager can also perform method 600.

As described above, quality level variation detector 226 can detect a quality level variation event based on the sizes of the video or audio transactions. Referring to FIG. 6A, after an initial step 610, multimedia transaction processor 228 can obtain (step 620) an elapsed time corresponding to the quality level variation event. As discussed above, the quality level variation event can indicate a variation of quality level from a first quality level to a second quality level. For example, the quality level variation event can indicate a video quality level variation from 720p to 1080p. After such quality level variation event is detected, multimedia transaction processor 228 can obtain the elapsed time (e.g., 19 seconds) that such quality level variation event occurred.

Referring to FIG. 6A, based on the elapsed time corresponding to the quality level variation event, multimedia transaction processor 228 can identify (step 630) a specific transaction using the video transactions and/or the audio transactions, where the multimedia content associated with the specific transaction has an actual cumulative media time that is greater than or equal to the elapsed time. As an example, FIG. 6B is an exemplary timing table 660 illustrating the relations between elapsed times, the measured cumulative media time, and the actual cumulative media time. Referring to FIG. 6B, column 662 represents the indices of transactions (e.g., index 0-13). For example, the index number 0 transaction represents the first transaction in the plurality of transactions. The index number 1 transaction represents the second transaction in the plurality of transactions, and so forth.

As shown in FIG. 6B, column 664 represents the elapsed time corresponding to each of the transactions. The elapsed time, also referred to as the wall-clock time, represents the time at which the transaction is completed or acquired. For example, the seventh transaction (i.e., the index number 6 transaction) has an elapsed time of 19 seconds, which indicates that the transaction is completed or acquired at 19 seconds from the time the first transaction is completed or acquired (e.g., a transaction completed at 0 second corresponding to the index number 0).

Referring to FIG. 6B, column 666 represents the measured cumulative media time corresponding to each of the transactions. As described above, each transaction can include multimedia content associated with a media time segment having a certain media time length (e.g., 5 seconds). In some embodiments, a certain transaction can provide multimedia content associated with a media time segment corresponding to a future time segment with respect to the elapsed time. For example, the index number 0 transaction completes at an elapsed time of 0 second and provides multimedia content associated with a media time segment of 0-5 seconds. The index number 1 transaction completes at an elapsed time of 4 seconds and provides multimedia content associated a media time segment of 5-10 seconds, and so forth. The measured cumulative media time represents the ending time of the media time segment associated with the multimedia content included in a transaction when, for example, there is no quality level variation event. Thus, when there is no quality level variation, the measured cumulative media time for the index number 1 transaction is 10 seconds.

Providing the multimedia content associated with media time segments in a future time allows client 210 to play the multimedia content without stalling. For example, as shown in FIG. 6B, when the elapsed time is at 4 seconds (e.g., the index number 1 transaction), the measured or actual cumulative media time is 10 seconds, indicating that the multimedia content associated with media time segments of 0-10 have been provided to client 210 (e.g., buffered in client 210). As a result, at elapsed time of 4 seconds, client 210 can have 10 seconds of buffered multimedia content and therefore stalling can be prevented.

In some embodiments, when a quality level variation event occurs at a certain elapsed time, one or more transactions having multimedia content associated with measured cumulative media times that are greater than the elapsed time may have already completed. Such transactions can include multimedia content at a quality level used prior to the quality level variation event occurs. In some embodiments, after the quality level variation event occurs, transactions including the same multimedia contents associated with the same multimedia time segment at a different quality level can be communicated or acquired. As a result, the transactions including multimedia content at the prior quality level can be discarded.

For example, referring to FIG. 6B, a quality level variation event occurs at an elapsed time of 19 seconds. When such quality level variation event occurs, the quality level can vary from a first quality level (e.g., a quality level of 760p) to a second quality level (e.g., a quality level of 1080p). The transaction at the elapsed time of 19 seconds corresponds to index number 6 and the corresponding measured cumulative media time is 35 seconds, indicating the media time segment of index number 6 transaction is 30-35 seconds, if the media time length per segment is five seconds.

As shown in FIG. 6B, column 668 represents the actual cumulative media time. The actual cumulative media time represents the ending time of the media time segment associated with the multimedia content included in a transaction when, for example, there is quality level variation event. After the quality level variation event occurs, the first transaction including multimedia content at the second quality level can provide multimedia content having media segment time starting at a time that is greater than the elapsed time when the quality level variation event occurs. For example, the first transaction including multimedia content at the second quality level can have a media segment starting at the nearest round-up time based on the media time length of the multimedia content included in a single transaction. In the above example where the quality level variation event occurs at 19 seconds of elapsed time, if the media time length of the multimedia content included in a single transaction is five seconds, the first transaction including the multimedia content at the second quality level can have a media time segment starting at 20 seconds (i.e., the nearest round-up time of 19 seconds using five seconds of media time length per segment) and ending at 25 seconds.

Referring to FIG. 6B, in the above example, the index number 6 transaction corresponds to a measured accumulative media time of 35 seconds, which is greater than the actual cumulative media time of 25 seconds (i.e., the ending time of the media time segment of the first transaction including the multimedia content at the second quality level). This indicates that one or more transactions having elapsed times that are less than the time when the quality variation event occurs may include multimedia content at the first quality level (e.g., a quality level of 760p). Such transactions may not be desired because the same multimedia content at the second quality level (e.g., a quality level of 1080p) are included in the transactions having elapsed time that is greater than the time when quality level variation event occurs.

In the above example where the quality level variation event occurs at 19 seconds of elapsed time, the first transaction including the multimedia content at the second quality level has a media time segment starting at 20 seconds. As shown in FIG. 6B, for example, the index number 4 and 5 transactions have measured cumulative media times of 25 seconds and 30 seconds, respectively. The measured cumulative media times of 25 seconds and 30 seconds indicate that their corresponding media time segments begin at 20 seconds and 25 seconds, respectively, if the media time length is five seconds. As a result, the index number 4 and 5 transactions include multimedia content at the first quality level, where the same multimedia content at the second quality level are communicated or acquired. Thus, these transactions are not required and can be discarded.

As shown in FIG. 6A, for discarding these duplicate transactions, multimedia transaction processor 228 can identify (step 630) a specific transaction. The multimedia content associated with the specific transaction has a measured cumulative media time that is greater than or equal to a round-up time based on the elapsed time at which the quality level variation event occurs. In the example from FIG. 6B, the specific transaction can be the index number 3 transaction, which corresponds to a measured cumulative media time of 20 seconds. If the media time length per segment is five seconds, the round-up time of the elapsed time at which the quality level variation event occurs (i.e., 19 seconds) is 20 seconds. Thus, the index number 3 transaction has a measured cumulative media time that equals the round-up time based on the elapsed time at which the quality level variation event occurs. As a result, the index number 3 transaction can be identified as the specific transaction.

Referring back to FIG. 6A, after identifying the specific transaction, multimedia transaction processor 228 can discard (step 640) one or more transactions following the specific transaction. The one or more discarded transactions include multimedia content at the first quality level, i.e., the quality level used prior to the quality level variation event occurs. Referring to FIG. 6B, in the above example where the quality level variation event occurs at 19 seconds of elapsed time, the index number 4 and 5 transactions include multimedia content at the first quality level and are thus discarded.

Column 668 illustrates the actual cumulative media time used by a client (e.g., client 210) after multimedia transaction processor 228 discards the index number 4 and 5 transactions that include multimedia content at the first quality level. As shown in column 668 of FIG. 6B, the actual cumulative media time used by client 210 remains at 20 seconds at index numbers 4 and 5. At index number 6, the quality level variation event occurs and the quality level is changed from the first quality level to a second quality level. Transactions that include multimedia content at the second quality level can be communicated or acquired. For example, at index number 6, a transaction can include multimedia content associate with a media time segment at the second quality level, where the media time segment is 20-25 seconds. Therefore, actual cumulative media time at the index number 6 transaction is 25 seconds. The subsequent transactions (e.g., the index number 7-13 transactions) can include multimedia content at the second quality level and thus the actual cumulative media time increases as illustrated in column 668.

Referring back to FIG. 6A, after discarding one or more transaction including multimedia content at the first quality level, method 600 can proceed to a stop 650. It is appreciated that method 600 for processing transactions can be performed to process video transactions, audio transactions, or both. After such processing, including discarding one or more video and/or audio transactions due to the quality level variation events, the number of the remaining video transactions can be different from the number of the remaining audio transactions. Subsequently, a mapping between the remaining video transactions and the remaining audio transactions can be performed. In some embodiments, the mapping enables aligning of the video content included in the remaining video transactions and the audio content included in the audio transactions, such that client 210 can play the video and audio content in a synchronized manner.

FIG. 7A is a flowchart representing an exemplary method 700 for identifying a mapping between video transactions and audio transactions, consistent with embodiments of the present disclosure. Referring to FIG. 7A, it will be readily appreciated by one of ordinary skill in the art that the illustrated procedure can be altered to delete steps or further include additional steps. Method 700 can be performed by adaptive traffic manager 130, and more particularly by video-audio transaction aligner 230 of the adaptive traffic manager 130. While method 700 is described as being performed by video-audio transaction aligner 230, it is appreciated that other components of adaptive traffic manager 130 or other devices can be involved. Further, it is appreciated that any other adaptive traffic manager can also perform method 700.

Referring to FIG. 7A, video-audio transaction aligner 230 can obtain (step 720) video transaction timestamps associated with the remaining video transactions and obtain (step 730) audio transaction timestamps associated with the remaining audio transactions. A timestamp associated with a video or an audio transaction represents the time that the transaction is communicated or acquired. A timestamp can be an elapsed time measured relative to the first transaction for transmitting multimedia content. In some embodiments, the timestamp of the first transaction can be set to time "0". A subsequent transaction can have a timestamp that is equal to the elapsed time measure from time "0".

As an example, FIG. 7B is an exemplary table 780 illustrating exemplary relations between transaction indices, timestamps of the remaining audio transactions, and timestamps of the remaining video transactions. As shown in FIG. 7B, column 782 represents the transaction indices (e.g., 0-16) of the plurality of video or audio transactions. Column 784 represents the audio transaction timestamps. In this example, there is a total of seventeen remaining audio transactions having transaction indices of 0-16. The index number 0 audio transaction has a timestamp of "0". The index number 1 audio transaction has a timestamp of "3", so forth. Column 786 represents the video transaction timestamps. In this example, there is a total of twelve remaining video transactions having transaction indices of 0-11. The index number 0 video transaction has a timestamp of "0". The index number 1 video transaction has a timestamp of "4", and so forth. As shown in FIG. 7B, the number of remaining audio transactions can be different from the number of remaining video transactions. And the timestamps of a specific audio transaction can be different from a specific video transaction that has the same transaction index. For example, for the same transaction index number 1, the audio transaction has a timestamp of "3" and the video transaction has a timestamp of "4", indicating that the audio transaction or the video transaction are not communicated, acquired, or completed at the same time.

Referring back to FIG. 7A, after obtaining the timestamps associated with the remaining audio transactions and the remaining video transactions, video-audio transaction aligner 230 can determine (step 740) a score matrix based on the video transaction timestamps and the audio transaction timestamps. In some embodiments, the score matrix can be determined using a dynamic time warping (DTW) algorithm. The scores in the score matrix can be the optimal or the least scores for matching a video transaction and an audio transaction. For example, using a DTW algorithm, video-audio transaction aligner 230 can determine a score matrix S with elements S(i, j), where S(i, j) is the optimal or the least score for matching the first "i" audio transactions and the first "j" video transactions. The number of rows and columns in the score matrix S equals the number of the audio transactions and the number of video transactions, respectively. As an example, video-audio transaction aligner 230 can use the following formulas to determine the elements of the score matrix S:

$$S(0,0) = \text{abs}(a(0) - v(0)) \quad (1)$$

$$S(0,j) = S(0,j-1) + \text{abs}(a(0) - v(j)), \text{ for } j > 0 \quad (2)$$

$$S(i,0) = S(i-1,0) + \text{abs}(a(i) - v(0)), \text{ for } i > 0 \quad (3)$$

$$S(i, j) = \text{abs}(a(i) - v(j)) + \min \begin{cases} S(i-1, j-1) \\ S(i-1, j) \\ S(i, j-1) \end{cases} \text{ for } i > 0, j > 0 \quad (4)$$

In the above formulas (1)-(4), a(i) represents the transaction timestamp of the $i^{th}$ audio transaction, and v(j) represents the transaction timestamp of the $i^{th}$ video transaction. Formulas (1)-(4) can be iteratively applied for determining the score matrix S.

FIG. 7C is an exemplary score matrix 790 illustrating an exemplary mapping between audio transactions and video transactions. For example, video-audio transaction aligner 230 can obtain score matrix 790 by applying the above formulas (1)-(4) to the video and audio transactions in table 780 illustrated in FIG. 7B.

Referring to FIG. 7C, the score of each matrix element S(i, j) of score matrix 790 corresponds to the optimal score for matching the first i audio transactions (e.g., the audio transactions having the audio transaction timestamps listed in column 784 of table 780 and reproduced in column 791 of score matrix 790, i.e., the left most column) and the first j video transactions (e.g., the video transactions having the video transaction timestamps listed in column 786 of table 780 and reproduced in row 792 of score matrix 790, i.e., the top most row).

In some embodiments, the score of the matrix element corresponding to the last row and the last column of score matrix S can represent the final optimal score for matching all the audio transactions and the video transactions. In the exemplary score matrix 790, the final optimal score of 16 is illustrated in matrix element 794Q. Using a score matrix S, video-audio transaction aligner 230 can also obtain an optimal matching path for all the video transactions and the audio transactions. Referring to FIG. 7C, for example, the optimal matching path includes matrix elements 794A-Q.

Referring back to FIG. 7A, using the optimal matching path in the score matrix, video-audio transaction aligner 230 can map (step 750) each of the remaining one or more video transactions to a corresponding remaining one or more audio transactions. The optimal matching path includes matrix elements that have the optimal or the least score in the corresponding columns and/or rows of the matrix elements. For example, referring to FIG. 7C, matrix element 794A has a score of 0, which is the least score in the matrix row containing matrix element 794A and also the least score in the matrix column containing matrix element 794A. Matrix element 794A corresponds to the video transaction having the video transaction timestamp of 0 second (i.e., the index number 0 video transaction illustrated in column 786 of FIG. 7B) and also corresponds to the audio transaction having the audio transaction timestamp of 0 second (i.e., the index number 0 audio transaction illustrated in column 784 of FIG. 7B). Thus, based on the score of matrix element 794A, video-audio transaction aligner 230 can map the index number 0 video transaction to the index number 0 audio transaction.

Similarly, matrix element 794B has a score of 1, which is the least score in the matrix row containing matrix element 794B and also the least score in the matrix column containing matrix element 794B. Matrix element 794B corresponds to the video transaction having the video transaction timestamp of 4 seconds (i.e., the index number 1 video transaction illustrated in column 786 of FIG. 7B) and the audio transaction having the audio transaction timestamp of 3 seconds (i.e., the index number 1 audio transaction illustrated in column 784 of FIG. 7B). Thus, based on the score of matrix element 794A, video-audio transaction aligner 230 can map the index number 1 video transaction to the index number 1 audio transaction illustrated in table 780 of FIG. 7B.

Video-audio transaction aligner 230 can also map other video transactions and audio transactions based on scores of the matrix elements contained in the optimal matching path (e.g., matrix elements 794C-Q of FIG. 7C). In some embodiments, the matrix elements contained in the optimal matching path are not required to be the optimal or least score in both the row and column it belongs to. For example, matrix element 794Q has a score of 16, which is the least score in the column containing matrix element 794Q, but is not the least score in the row containing matrix element 794Q (e.g., the least score is 14).

Referring to FIG. 7C, in some embodiments, video-audio transaction aligner 230 can map one or more audio transactions to a single video transaction, or vice versa. For example, in score matrix 790, score matrix elements 794F and 794G correspond to the audio transactions having timestamps of 21 and 22 seconds (i.e., the index number 5 and 6 audio transactions illustrated in column 784 of FIG. 7B), respectively. Score matrix elements 794F has a score of 3, which is the least score among those of the matrix row and the matrix column containing matrix elements 794F. Matrix elements 794G has a score of 4, which is the least score among those of the matrix row containing matrix elements 794G, and the second least score among those of the matrix column containing matrix elements 794G. Based on the scores of matrix elements 794F and 794G, video-audio transaction aligner 230 can map these two audio transactions to the video transaction having timestamps of 21 second (i.e., the index number 5 video transactions illustrated in column 786 of FIG. 7B).

Similarly, while score matrix 790 illustrates the mapping two or more audio transactions to a single video transaction, it is appreciated that video-audio transaction aligner 230 can also map two or more video transactions to a single audio transaction when there are more video transactions than audio transactions. It is further appreciated that video-audio transaction aligner 230 can map audio transactions and video transactions based on the any desired selection of the optimal matching path of a score matrix.

In some embodiments, after video-audio transaction aligner 230 maps two or more transactions of one type to a single transaction of the other type, video-audio transaction aligner 230 can retain one of the multiple transactions and discard the other transactions. Video-audio transaction aligner 230 can select the transaction for retaining based on determination of an optimal score among the scores of the matrix elements of corresponding to the multiple transactions.

For example, as shown in FIG. 7C, video-audio transaction aligner 230 maps audio transactions having timestamps of 21 and 22 seconds (i.e., the index number 5 and 6 audio transactions illustrated in column 784 of FIG. 7B) to the video transaction having timestamps of 21 second (i.e., the index number 5 video transactions illustrated in column 786 of FIG. 7B). After such mapping, video-audio transaction aligner 230 can retain the audio transactions having timestamps of 21 second (i.e., the index number 5 audio transaction illustrated in column 784 of FIG. 7B) based on the determination that optimal score among the scores of matrix elements 794F and 794G, i.e., 3 and 4, respectively, is 3.

As shown in FIG. 7A, after video-audio transaction aligner 230 maps the audio transactions and the video transactions and discards one or more transactions such that each of the audio transaction is mapped to a different video transaction, method 700 can proceed to a stop 760. It is appreciated that method 700 can also be repeated to map more audio transactions and more video transactions.

FIG. 8 is a flowchart representing an exemplary method 800 for determining the one or more quality of experience (QoE) parameters based on the mapped video transactions and audio transactions, consistent with the embodiments of the present disclosure. Referring to FIG. 8, it will be readily appreciated by one of ordinary skill in the art that the illustrated procedure can be altered to delete steps or further include additional steps. Method 800 can be performed by an adaptive traffic manager 130, and more particularly by a parameter estimator 232 of adaptive traffic manager 130. While method 800 is described as being performed by parameter estimator 232, it is appreciated that other components of adaptive traffic manager or other devices can be involved.

Referring to FIG. 8, after an initial step 810, parameter estimator 232 can determine (step 820) video bitrates and audio bitrates using the processed (e.g., mapped) audio and video transactions. In some embodiments, each transaction can include multimedia content having a fixed media time length (e.g., 5 seconds) or a varied media time length. The audio bitrate or the video bitrate can be estimated based on the media time length and the size of the transaction. In some embodiments, a transaction can include headers (e.g., HTTP headers). As a result, the size of the multimedia content included in each transaction equals the difference between the size of the transaction and the size of the headers. When the transaction is an unsecured transaction, parameter estimator 232 can obtain the size of the headers. When the transaction is a secured transaction such as an encrypted transaction, parameter estimator 232 can estimate the approximate size of the header of the secured transaction to have, for example, a fixed size (e.g., 500 bytes).

In some embodiments, the audio bitrate equals the size of the audio content (i.e., the difference of the size of the audio transaction and the size of the audio transaction headers) divided by the media time length of the audio content included in the audio transaction. Similarly, the video bitrate equals size of the video content (i.e., the difference of the size of the video transaction and the size of the video transaction headers) divided by the media time length of the video content included in the video transaction.

In some embodiments, parameter estimator 232 can estimate the sizes of the multimedia content included in each of the processed video transactions and each of the processed audio transactions. Based on estimated sizes of the processed video transactions and the processed audio transactions, parameter estimator 232 can estimate the average video bitrate (e.g., 178 kbps) and the average audio bitrate (e.g., 74 kbps), respectively. Further, using the estimated sizes of the processed video transactions and the processed audio transactions, parameter estimator 232 can also estimate variations of video bitrates and audio bitrates with respect to the average video bitrate and the average audio bitrate, respectively.

Referring to FIG. 8, parameter estimator 232 can determine (step 830) a total media time associated with the multimedia content provided to a specific terminal. The total media time equals the number of transactions multiplied by the media time length per segment. Using the example illustrated in FIGS. 7B and 7C, after the processing (e.g., aligning) of the transactions, there are total of 12 video transactions and 12 corresponding audio transactions. Each of the video or audio transactions can include multimedia content having a media time length of 5 seconds. Accordingly, the total media time is 60 seconds (i.e., 12 transactions×5 seconds).

Referring back to FIG. 8, parameter estimator 232 can further determine (step 840) a stalling event. In some embodiments, the total media time can represent the amount of media time that is played by client 210. Parameter estimator 232 can detect stalling events based on the total media time and one or more timestamps of the transactions. For example, parameter estimator 232 can estimate a total elapsed time using the timestamp of the last transaction relative to timestamps of the first transaction when a multimedia session begins. A multimedia session includes one or more audio transactions and video transactions. Parameter estimator 232 can obtain the difference between the total elapsed time and the total media time, and determine that a stalling event occurs if the total elapsed time is greater than the total media time.

Referring to FIG. 8, parameter estimator 232 can determine (step 850) a size of wasted data. In some embodiments, the adaptive bit-rate protocols such as the HLS protocols can adjust the quality level based on, for example, the available bandwidth for a specific terminal or the network (e.g., network 101). Adjusting the quality levels can cause an undesirable side effect of wasting data. As described above, when a quality level variation occurs, a number of transactions having multimedia content at the old quality level can be discarded and thus wasted. As another example, under degraded network conditions or when server 260 introduces large delays while providing multimedia content, client 210 can repeatedly send a request for particular multimedia content having certain media time segments that are previously requested. In this case, one or more server responses can include duplicate multimedia content, which are transmitted to client 210 multiple times. In some cases, only one of these responses reaches client 210 within the time required for a real-time playback of the multimedia content. The duplicated multimedia content included in the other server responses are thus wasted.

In some embodiments, parameter estimator 232 can determine the size of the wasted data during a multimedia session based on the size of the processed transactions and the size of the unprocessed transactions. As described above, after a quality level variation event occurs, multimedia transaction processor 228 can discard one or more audio and/or video transactions that include multimedia content associated with a quality level used prior to the quality level variation event. Further, video-audio transaction aligner 230 can discard one or more audio and/or video transactions such that the number of audio transactions equals the number of video transactions. Parameter estimator 232 can estimate the size of these discarded transactions. Parameter estimator 232 can thus estimate the size of wasted data based on the size of these discarded transactions. For example, if the total size of all video transactions is 1,906,192 bytes and the size of the processed video transactions (i.e., excluding discarded video transactions) is 1,333,219 bytes, the percentage of the wasted video data is thus 30%, that is, the difference of the size of the unprocessed video transactions and processed video transactions divided by the size of the unprocessed video transactions. Similarly, if the total size of all audio transactions is 1,027,644 bytes and the size of the processed audio transactions (i.e., excluding the discarded audio transactions) is 553,562 bytes, the percentage of the wasted audio data is thus 46%. The overall wasted data, including the wasted audio data and the wasted video data, is thus 36%.

In some embodiments, the wasted data can be represented using the number of discarded transactions. For example, if the total number of video transactions is 14 and the number of the processed video transactions is 12, the percentage of the wasted video data is 14%. Similarly, if the total number of audio transactions is 21 and the number of the processed audio transactions is 12, the percentage of the wasted audio data is thus 43%. The overall wasted data, including the wasted audio data and the wasted video data, is thus 31%.

In some embodiments, the wasted data can be represented using the length of media time segments. Similar to the above examples, the wasted data can be represented in terms of wasted video data using the length of media time segments in the discarded video transactions, in terms of wasted audio data using the length of media time segments in the discarded audio transactions, and in terms of an overall waste data. Referring to FIG. 8, after step 850, method 800 can proceed to a stop 860. Method 800 can also be repeated any desired number of times for estimating the parameters.

In the foregoing specification, an element (e.g., adaptive traffic manager) can have one or more processors and at least one memory for storing program instructions corresponding to methods 300, 400, 500, 600, and 700, consistent with embodiments of the present disclosure. The processor(s) can be a single or multiple microprocessors, field programmable gate arrays (FPGAs), or digital signal processors (DSPs) capable of executing particular sets of instructions. Computer-readable instructions can be stored on a tangible and/or non-transitory computer-readable medium, such as random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, flash memory, registers, caches, and/or any other storage medium. Alternatively, the methods can be implemented in hardware components or combinations of hardware and software such as, for example, ASICs and/or special purpose computers.

Embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus for estimating one or more quality of experience (QoE) parameters associated with a specific terminal, comprising:
   a traffic processor configured to acquire a plurality of transactions for providing multimedia content to a specific terminal, wherein at least one of the transactions is a secured transaction; and
   a QoE parameter estimator configured to:
      detect a quality level variation event based on the plurality of transactions and the sizes of one or more of the plurality of transactions, and
      estimate the one or more QoE parameters based on the detection of the quality level variation event, wherein the estimation of the one or more QoE parameters can be used for at least one of: optimizing or reporting of the multimedia content provided to the specific terminal.

2. The apparatus of claim 1, wherein the QoE parameter estimator is configured to detect the quality level variation event comprises the QoE parameter estimator being configured to:
   identify, using the plurality of transactions, one or more video transactions and one or more audio transactions; and
   detect the quality level variation event using at least one of the one or more video transactions or the one or more audio transactions.

3. The apparatus of claim 2, wherein the QoE parameter estimator is configured to identify the one or more video transactions and the one or more audio transactions comprises the QoE parameter estimator being configured to:
   obtain a current transaction of the plurality of transactions and one or more neighboring transactions of the current transaction;
   determine a size of the current transaction and an average size of the current transaction and the one or more neighboring transactions;
   determine a relation of the size of the current transaction and the average size of the current transaction and the one or more neighboring transactions; and identify the current transaction as an audio transaction or a video transaction based on the relation of the size of the current transaction and the average size of the current transaction and the one or more neighboring transactions.

4. The apparatus of claim 3, wherein the one or more neighboring transactions comprise five transactions that are closest in time to the current transaction.

5. The apparatus of claim 2, wherein the QoE parameter estimator is configured to detect the quality level variation event using the one or more video transactions comprises the QoE parameter estimator being configured to:
obtain a current video transaction based on the one or more video transactions;
obtain one or more preceding video transactions of the current video transaction and one or more following video transactions of the current video transaction;
determine the size of the current video transaction, the average size of the one or more preceding video transactions, and the average size of the one or more following video transactions;
obtain a first video size difference and a second video size difference, wherein the first video size difference is the difference between the size of the current video transaction and the average size of the preceding video transactions, and wherein the second video size difference is the difference between the size of the current video transaction and the average size of the following video transactions; and
detect the qualify level variation event based on at least one of: the first video size difference and a first video size difference threshold, or the second video size difference and a second video size difference threshold.

6. The apparatus of claim 5, wherein the preceding video transactions include two video transactions, and the following video transactions include two transactions.

7. The apparatus of claim 5, wherein an absolute value of the first video size difference threshold is greater than or equal to 40% and an absolute value of the second video size difference threshold is less than or equal to 5%.

8. The apparatus of claim 2, wherein the QoE parameter estimator is configured to detect the quality level variation event using the one or more audio transactions comprises the QoE parameter estimator being configured to:
identify a current audio transaction using the one or more audio transactions;
identify one or more preceding audio transactions of the current audio transaction and one or more following audio transactions of the current audio transaction;
obtain the size of the identified current audio transaction, the average size of the identified one or more preceding audio transactions, and the average size of the identified one or more following audio transactions;
obtain a first audio size difference and a second audio size difference, wherein the first audio size difference is the difference between the size of the identified current audio transaction and the average size of the identified preceding audio transactions and the second audio size difference being the difference between the size of the current audio transaction and the average size of the following audio transactions; and
detect the quality level variation event based on at least one of: the first audio size difference and a first audio size difference threshold, or the second audio size difference and a second audio size difference threshold.

9. The apparatus of claim 2, wherein the QoE parameter estimator is configured to estimate the one or more QoE parameters comprises the QoE parameter estimator being configured to:
process at least one of the one or more video transactions or the one or more audio transactions based on the detected quality level variation event; and
determine the one or more quality of experience (QoE) parameters using the processed one or more video transactions and the processed one or more audio transactions.

10. The apparatus of claim 9, wherein the QoE parameter estimator is configured to process at least one of the one or more video transactions or the one or more audio transactions comprises the QoE parameter estimator being configured to:
obtain an elapsed time corresponding to the quality level variation event, the quality level variation event indicating a variation of quality level from a first quality level to a second quality level;
identify a specific transaction using at least one of the one or more video transactions or the one or more audio transactions, the multimedia content associated with the specific transaction having an cumulative media time that is greater than or equal to the elapsed time; and
discard one or more following transactions of the specific transaction, the one or more discarded transactions including multimedia content that is associated with a first quality level.

11. The apparatus of claim 10, wherein the cumulative media time associated with the specific transaction is the nearest round-up time of the elapsed time associated with the specific transaction based on a media time length of multimedia content associated with a single transaction.

12. The apparatus of claim 10, wherein the QoE parameter estimator is configured to process the one or more video transactions and the one or more audio transactions comprises the QoE parameter estimator being further configured to:
identify a mapping between remaining one or more video transactions and remaining one or more audio transactions, the mapping excluding the discarded transactions.

13. The apparatus of claim 12, wherein the QoE parameter estimator is configured to identify the mapping between the remaining one or more video transactions and the remaining one or more audio transactions comprises the QoE parameter estimator being configured to:
obtain video transaction timestamps associated with the remaining one or more video transactions;
obtain audio transaction timestamps associated with the remaining one or more audio transactions;
determine a score matrix based on the video transaction timestamps and the audio transaction timestamps; and
map, based on the score matrix, the remaining one or more video transactions and the remaining one or more audio transactions.

14. The apparatus of claim 13, wherein the number of remaining one or more video transactions and the number of remaining one or more audio transactions are different and wherein the QoE parameter estimator is configured to map the remaining one or more video transactions and the remaining one or more audio transactions comprises the QoE parameter estimator being configured to discard at least one of: one or more redundant video transactions or one or more redundant audio transactions.

15. The apparatus of claim 13, wherein the QoE parameter estimator is configured to determine the score matrix based on a dynamic time wrapping algorithm.

16. The apparatus of claim 9, wherein the QoE parameter estimator is configured to determine the one or more quality of experience (QoE) parameters comprises the QoE parameter being configured to determine, using the processed one or more video transactions and the processed one or more audio transactions, at least one of:
one or more video bitrates associated with the processed one or more video transactions;
one or more audio bitrates associated with the processed one or more audio transactions;
a total media time associated with the multimedia content provided to the specific terminal;
a stalling event; or
a size of wasted data.

17. The apparatus of claim 16, wherein the QoE parameter estimator is configured to:
determine the one or more video bitrates based on sizes of the processed one or more video transactions and a media time length of multimedia content associated with a single video transaction;
determine the one or more audio bitrates based on sizes of the processed one or more audio transactions and a media time length of multimedia content associated with a single audio transaction;
determine the total media time based on at least one of: a number of the processed one or more video transactions and the media time length of multimedia content associated with a single video transaction, or a number of the processed one or more audio transactions and the media time length of multimedia content associated with a single audio transaction;
determine the stalling event based on the total media time and a timestamp associated with the last transaction in time of the processed one or more video transactions or the processed one or more audio transactions; and
determine the size of the wasted data based on at least one of: a size of the processed one or more video transactions and unprocessed one or more video transactions, or a size of the processed one or more audio transactions and unprocessed one or more audio transactions.

18. A computer-implemented method for estimating one or more quality of experience (QoE) parameters associated with a specific terminal, the method being performed by one or more processors, the method comprising:
acquiring a plurality of transactions for providing multimedia content to a specific terminal, wherein at least one of the transactions is a secured transaction;
detecting a quality level variation event based on the plurality of transactions and the sizes of one or more of the plurality of transactions; and
estimating the one or more QoE parameters based on the detection of the quality level variation event, wherein the estimation of the one or more QoE parameters can be used for at least one of: optimizing or reporting of the multimedia content provided to the specific terminal.

19. The method of claim 18, wherein detecting the quality level variation event comprises:
identifying, using the plurality of transactions, one or more video transactions and one or more audio transactions; and
detecting the quality level variation event using at least one of the one or more video transactions or the one or more audio transactions.

20. The method of claim 19, wherein identifying the one or more video transactions and the one or more audio transactions comprises:
obtaining a current transaction of the plurality of transactions and one or more neighboring transactions of the current transaction;
determining a size of the current transaction and an average size of the current transaction and the one or more neighboring transactions;
determining a relation of the size of the current transaction and the average size of the current transaction and the one or more neighboring transactions; and
identifying the current transaction as an audio transaction or a video transaction based on the relation of the size of the current transaction and the average size of the current transaction and the one or more neighboring transactions.

21. The method of claim 19, wherein detecting the quality level variation event using the one or more video transactions comprises:
obtaining a current video transaction based on the one or more video transactions;
obtaining one or more preceding video transactions of the current video transaction and one or more following video transactions of the current video transaction;
determining the size of the current video transaction, the average size of the one or more preceding video transactions, and the average size of the one or more following video transactions;
obtaining a first video size difference and a second video size difference, wherein the first video size difference is the difference between the size of the current video transaction and the average size of the preceding video transactions, and wherein the second video size difference is the difference between the size of the current video transaction and the average size of the following video transactions; and
detecting the qualify level variation event based on at least one of: the first video size difference and a first video size difference threshold, or the second video size difference and a second video size difference threshold.

22. The method of claim 19, wherein detecting the quality level variation event using the one or more audio transactions comprises:
identifying a current audio transaction using the one or more audio transactions;
identifying one or more preceding audio transactions of the current audio transaction and one or more following audio transactions of the current audio transaction;
obtaining the size of the identified current audio transaction, the average size of the identified one or more preceding audio transactions, and the average size of the identified one or more following audio transactions;
obtaining a first audio size difference and a second audio size difference, wherein the first audio size difference is the difference between the size of the identified current audio transaction and the average size of the identified preceding audio transactions and the second audio size difference being the difference between the size of the current audio transaction and the average size of the following audio transactions; and
detecting the quality level variation event based on at least one of: the first audio size difference and a first audio size difference threshold, or the second audio size difference and a second audio size difference threshold.

23. The method of claim 19, wherein estimating the one or more QoE parameters comprises:

processing at least one of the one or more video transactions or the one or more audio transactions based on the detected quality level variation event; and determining the one or more quality of experience (QoE) parameters using the processed one or more video transactions and the processed one or more audio transactions.

24. The method of claim 23, wherein processing the at least one of the one or more video transactions or the one or more audio transactions comprises:

obtaining an elapsed time corresponding to the quality level variation event, the quality level variation event indicating a variation of quality level from a first quality level to a second quality level;

identifying a specific transaction using at least one of the one or more video transactions or the one or more audio transactions, the multimedia content associated with the specific transaction having an cumulative media time that is greater than or equal to the elapsed time; and discarding one or more following transactions of the specific transaction, the one or more discarded transactions including multimedia content that is associated with a first quality level.

25. The method of claim 24, wherein processing the one or more video transactions and the one or more audio transactions comprises:

identifying a mapping between remaining one or more video transactions and remaining one or more audio transactions, the mapping excluding the discarded transactions.

26. The method of claim 25, wherein identifying the mapping between the remaining one or more video transactions and the remaining one or more audio transactions comprises:

obtaining video transaction timestamps associated with the remaining one or more video transactions;

obtaining audio transaction timestamps associated with the remaining one or more audio transactions;

determining a score matrix based on the video transaction timestamps and the audio transaction timestamps; and mapping, based on the score matrix, the remaining one or more video transactions and the remaining one or more audio transactions.

27. The method of claim 26, wherein the number of remaining one or more video transactions and the number of remaining one or more audio transactions are different and wherein mapping the remaining one or more video transactions and the remaining one or more audio transactions comprises:

discarding at least one of: one or more redundant video transactions or one or more redundant audio transactions.

28. The method of claim 23, wherein determining the one or more quality of experience (QoE) parameters comprises determining, using the processed one or more video transactions and the processed one or more audio transactions, at least one of:

one or more video bitrates associated with the processed one or more video transactions;

one or more audio bitrates associated with the processed one or more audio transactions;

a total media time associated with the multimedia content provided to the specific terminal;

a stalling event; or a size of wasted data.

29. A non-transitory computer readable storage medium storing instruction that are executable by a one or more processors to cause the one or more processors to perform a method for estimating one or more quality of experience (QoE) parameters associated with a specific terminal, the method comprising:

acquiring a plurality of transactions for providing multimedia content to a specific terminal, wherein at least one of the transactions is a secured transaction;

detecting a quality level variation event based on the plurality of transactions and the sizes of one or more of the plurality of transactions; and estimating the one or more QoE parameters based on the detection of the quality level variation event, wherein the estimation of the one or more QoE parameters can be used for at least one of: optimizing or reporting of the multimedia content provided to the specific terminal.

30. The computer readable storage medium of claim 29, wherein detecting the quality level variation event comprises:

identifying, using the plurality of transactions, one or more video transactions and one or more audio transactions; and detecting the quality level variation event using at least one of the one or more video transactions or the one or more audio transactions.

31. The computer readable storage medium of claim 30, wherein identifying the one or more video transactions and the one or more audio transactions comprises:

obtaining a current transaction of the plurality of transactions and one or more neighboring transactions of the current transaction;

determining a size of the current transaction and an average size of the current transaction and the one or more neighboring transactions;

determining a relation of the size of the current transaction and the average size of the current transaction and the one or more neighboring transactions; and identifying the current transaction as an audio transaction or a video transaction based on the relation of the size of the current transaction and the average size of the current transaction and the one or more neighboring transactions.

32. The computer readable storage medium of claim 30, wherein detecting the quality level variation event using the one or more video transactions comprises:

obtaining a current video transaction based on the one or more video transactions;

obtaining one or more preceding video transactions of the current video transaction and one or more following video transactions of the current video transaction;

determining the size of the current video transaction, the average size of the one or more preceding video transactions, and the average size of the one or more following video transactions;

obtaining a first video size difference and a second video size difference, wherein the first video size difference is the difference between the size of the current video transaction and the average size of the preceding video transactions, and wherein the second video size difference is the difference between the size of the current video transaction and the average size of the following video transactions; and detecting the qualify level variation event based on at least one of: the first video size difference and a first video size difference threshold, or the second video size difference and a second video size difference threshold.

33. The computer readable storage medium of claim 30, wherein detecting the quality level variation event using the one or more audio transactions comprises:
   identifying a current audio transaction using the one or more audio transactions;
   identifying one or more preceding audio transactions of the current audio transaction and one or more following audio transactions of the current audio transaction;
   obtaining the size of the identified current audio transaction, the average size of the identified one or more preceding audio transactions, and the average size of the identified one or more following audio transactions;
   obtaining a first audio size difference and a second audio size difference, wherein the first audio size difference is the difference between the size of the identified current audio transaction and the average size of the identified preceding audio transactions and the second audio size difference being the difference between the size of the current audio transaction and the average size of the following audio transactions; and
   detecting the quality level variation event based on at least one of: the first audio size difference and a first audio size difference threshold, or the second audio size difference and a second audio size difference threshold.

34. The computer readable storage medium of claim 30, wherein estimating the one or more QoE parameters comprises:
   processing at least one of the one or more video transactions or the one or more audio transactions based on the detected quality level variation event; and
   determining the one or more quality of experience (QoE) parameters using the processed one or more video transactions and the processed one or more audio transactions.

35. The computer readable storage medium of claim 34, wherein processing the at least one of the one or more video transactions or the one or more audio transactions comprises:
   obtaining an elapsed time corresponding to the quality level variation event, the quality level variation event indicating a variation of quality level from a first quality level to a second quality level;
   identifying a specific transaction using at least one of the one or more video transactions or the one or more audio transactions, the multimedia content associated with the specific transaction having an cumulative media time that is greater than or equal to the elapsed time; and
   discarding one or more following transactions of the specific transaction, the one or more discarded transactions including multimedia content that is associated with a first quality level.

36. The computer readable storage medium of claim 35, wherein processing the one or more video transactions and the one or more audio transactions comprises:
   identifying a mapping between remaining one or more video transactions and remaining one or more audio transactions, the mapping excluding the discarded transactions.

37. The computer readable storage medium of claim 36, wherein identifying the mapping between the remaining one or more video transactions and the remaining one or more audio transactions comprises:
   obtaining video transaction timestamps associated with the remaining one or more video transactions;
   obtaining audio transaction timestamps associated with the remaining one or more audio transactions;
   determining a score matrix based on the video transaction timestamps and the audio transaction timestamps; and
   mapping, based on the score matrix, the remaining one or more video transactions and the remaining one or more audio transactions.

38. The computer readable storage medium of claim 37, wherein the number of remaining one or more video transactions and the number of remaining one or more audio transactions are different and wherein mapping the remaining one or more video transactions and the remaining one or more audio transactions comprises:
   discarding at least one of: one or more redundant video transactions or one or more redundant audio transactions.

39. The computer readable storage medium of claim 34, wherein determining the one or more quality of experience (QoE) parameters comprises determining, using the processed one or more video transactions and the processed one or more audio transactions, at least one of:
   one or more video bitrates associated with the processed one or more video transactions;
   one or more audio bitrates associated with the processed one or more audio transactions;
   a total media time associated with the multimedia content provided to the specific terminal;
   a stalling event; or
   a size of wasted data.

40. The apparatus of claim 1, wherein the QoE parameter estimator is configured to detect the quality level variation event based on a variation of sizes of the plurality of transactions with respect to time.

41. The apparatus of claim 40, wherein the variation is determined based on a first size of one or more first transactions of the plurality of transactions, a second size of one or more second transactions of the plurality of transactions, and a third size of one or more third transactions of the plurality of transaction that occurs between the one or more first and second transactions with respect to time.

42. The apparatus of claim 41, wherein the one or more first transactions comprise a plurality of first transactions, and the one or more second transactions comprise a plurality of second transactions; wherein the first size corresponds to a first average size of the plurality of first transactions, and the second size corresponds to a second average size of the plurality of second transactions.

43. The apparatus of claim 41, wherein the transactions are video transactions or audio transactions.

* * * * *